US012524968B2

(12) United States Patent
Wu et al.

(10) Patent No.: US 12,524,968 B2
(45) Date of Patent: Jan. 13, 2026

(54) PRESENTING LABELS IN AUGMENTED REALITY

(71) Applicant: Apple Inc., Cupertino, CA (US)

(72) Inventors: Ting-Yuan Wu, Campbell, CA (US); Lukasz J. Pasek, Campbell, CA (US); Ishan Bhutani, Sunnyvale, CA (US); Syed Mohsin Hasan, San Jose, CA (US); Isil Uzum Vella, San Francisco, CA (US); Eugene P. Sturm, Mill Valley, CA (US); Razvan Bangu, Sunnyvale, CA (US); Paul F. Ahrens, Seattle, WA (US); Matthew B. Ball, Pacifica, CA (US); Patrick J. Coleman, San Ramon, CA (US); Benjamin R. Dreyer, Santa Cruz, CA (US); Roy E. West, Berkeley, CA (US); Brian J. Andrich, San Francisco, CA (US); George Magharious, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/735,861

(22) Filed: Jun. 6, 2024

(65) Prior Publication Data
US 2024/0355058 A1 Oct. 24, 2024

Related U.S. Application Data

(63) Continuation of application No. 17/828,878, filed on May 31, 2022, now Pat. No. 12,039,672.
(Continued)

(51) Int. Cl.
G06T 19/00 (2011.01)
G06T 15/06 (2011.01)
G06T 17/20 (2006.01)

(52) U.S. Cl.
CPC ............ *G06T 19/003* (2013.01); *G06T 15/06* (2013.01); *G06T 17/20* (2013.01); *G06T 19/006* (2013.01)

(58) Field of Classification Search
None
See application file for complete search history.

(56) References Cited

U.S. PATENT DOCUMENTS 9,672,588 B1 6/2017 Doucette et al.
11,113,328 B2 9/2021 Anorga et al.
(Continued)

OTHER PUBLICATIONS

Izuru et al., Machine translated Japanese Patent 2014120109 (Year: 2014).

*Primary Examiner* — Tapas Mazumder
(74) *Attorney, Agent, or Firm* — Invoke

(57) ABSTRACT

In some implementations, a computing device can present augmented reality (AR) labels in an AR video stream. For example, the computing device can obtain route information for a route requested by a user and can determine locations along the route for placing candidate AR labels. The computing device can determine the precise location of the computing device using camera depth information obtained in response to the user scanning the local real-world environment with a camera of the computing device. The computing device can select an AR label and/or label placement location for presentation in an AR video stream based on various criteria, including the distance between the candidate AR labels and the precise location of the computing device, priorities assigned to each candidate AR label, and/or whether a clear line of sight exists between the precise location of the computing device and the candidate AR label location.

21 Claims, 15 Drawing Sheets

Related U.S. Application Data

(60) Provisional application No. 63/202,313, filed on Jun. 6, 2021.

(56) References Cited

U.S. PATENT DOCUMENTS

| | | | |
|---|---|---|---|
| 2007/0204218 A1* | 8/2007 | Weber | G01C 21/20 |
| | | | 701/538 |
| 2012/0130762 A1* | 5/2012 | Gale | G06V 20/20 |
| | | | 714/49 |
| 2013/0326425 A1* | 12/2013 | Forstall | G01C 21/3878 |
| | | | 715/851 |
| 2014/0123062 A1* | 5/2014 | Nguyen | G01C 21/3682 |
| | | | 715/810 |
| 2015/0356063 A1 | 12/2015 | Jiang et al. | |
| 2019/0311545 A1* | 10/2019 | Kintner | G06T 19/006 |
| 2020/0082625 A1 | 3/2020 | Bastide et al. | |
| 2021/0021957 A1 | 1/2021 | Beaurepaire et al. | |
| 2021/0352262 A1* | 11/2021 | Buslaev | G06T 7/80 |

* cited by examiner

PRESENTING LABELS IN AUGMENTED REALITY

INCORPORATION BY REFERENCE; DISCLAIMER

Each of the following applications are hereby incorporated by reference: application Ser. No. 17/828,878 filed on May 31, 2022; Application No. 63/202,313 filed on Jun. 6, 2021. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to presenting graphical elements in an augmented reality video stream.

BACKGROUND

Augmented reality (AR) is becoming an important feature of modern mobile devices. However, presenting graphical objects in an AR video stream presents challenges. For example, when AR is used to enhance navigation features of a mobile device, it can often be difficult to determine where to place graphical objects, such as road signs, business names, maneuver instructions, and/or other labels, in the AR video stream presented by the mobile device so that the user of the mobile device will have an adequate view (e.g., readable view) of the label.

SUMMARY

In some implementations, a computing device can present augmented reality (AR) labels in an AR video stream. For example, the computing device can obtain route information for a route requested by a user and can determine locations along the route for placing candidate AR labels. The computing device can determine the precise location of the computing device using camera depth information obtained in response to the user scanning the local real-world environment with a camera of the computing device. The computing device can select an AR label and/or label placement location for presentation in an AR video stream based on various criteria, including the distance between the candidate AR labels and the precise location of the computing device, priorities assigned to each candidate AR label, and/or whether a clear line of sight exists between the precise location of the computing device and the candidate AR label location.

Particular implementations provide at least the following advantages. The processes described herein can improve the legibility of AR labels in AR video streams and, thereby, make AR video streams more useful as a navigation aid when users are navigating routes. The processes described herein improve the selection of the most relevant and/or important AR labels by using priority and/or distance criteria when selecting from among various candidate AR labels. Users can be protected from harm by preventing users from viewing the AR video stream when the user is moving.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
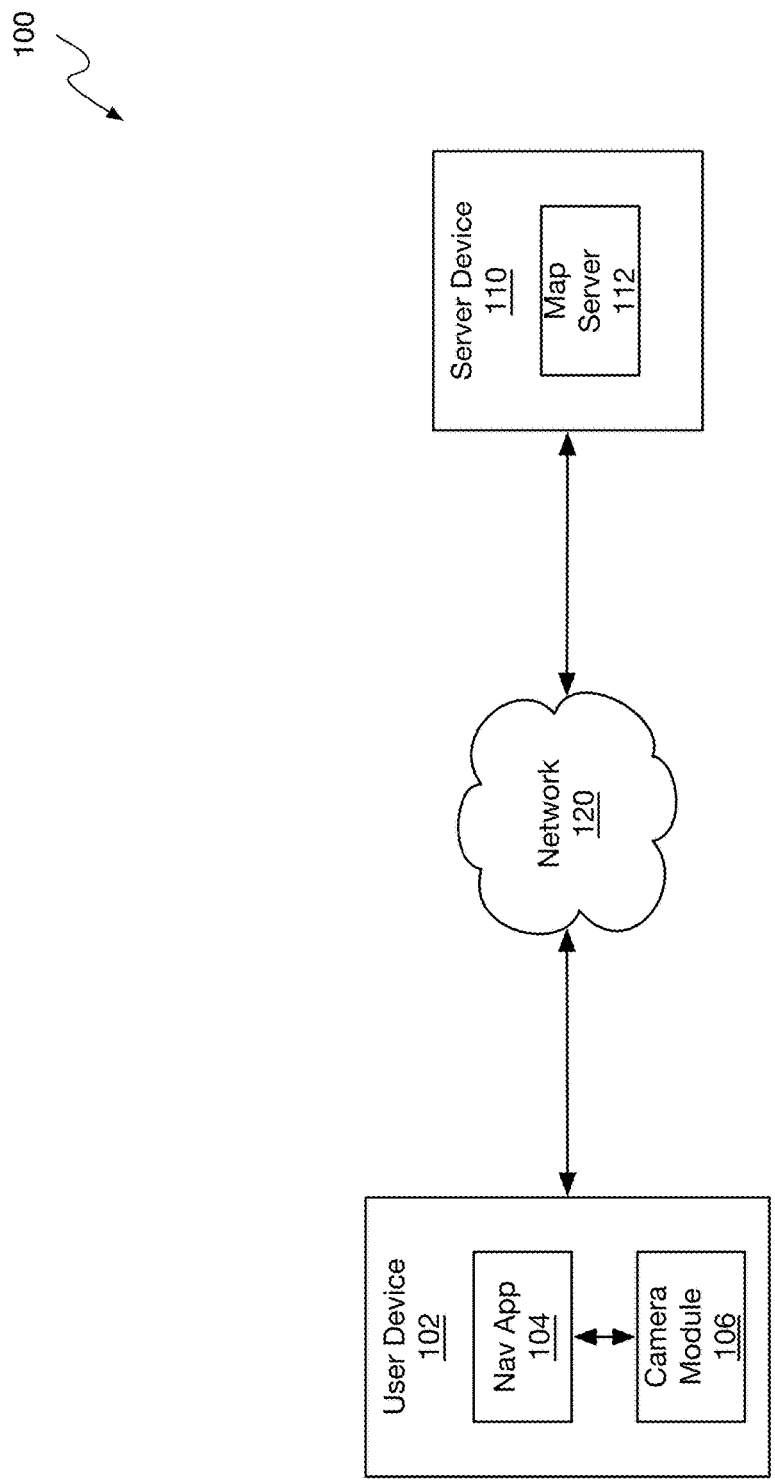
FIG. 1 is a block diagram of an example system for presenting labels in augmented reality.

FIG. 1 is a block diagram of an example system 100 for presenting labels in augmented reality. For example, system 100 can be configured to present an augmented reality (AR) video stream to assist the user in navigating along a route (e.g., walking route, driving route, biking route, etc.). System 100 can determine which AR labels to place and/or where to place the AR labels based on various criteria, including the distance between the candidate AR labels and the precise location of the computing device, priorities assigned to each candidate AR label, and/or whether a clear line of sight exists between the precise location of the computing device and the candidate AR label location, as described in detail below.

In some implementations, system 100 can include user device 102. For example, user device 102 can be a computing device, such as a smartphone, smart glasses, tablet computer, or other portable computing device.

In some implementations, user device 102 can include navigation application 104 that can provide navigation instructions, map displays, and/or an AR navigation experience to the user of user device 102. For example, navigation application 104 can present an AR video stream that includes AR labels that provide the user with information about the local real-world environment and/or navigation instructions for how to traverse a route from the current location of user device 102 to a destination location specified by the user of user device 102, as described in detail below.

In some implementations, user device 102 can include camera module 106. For example, camera module 106 can correspond to a hardware camera system, including one or more image sensors (e.g., digital cameras) and/or range sensors (e.g., LiDAR sensors). Camera module 106 can correspond to a software camera system that can generate an image based on data received from the image sensors and/or generate range data that can be used to determine the distance from user device 102 to physical objects in the local real-world environment. Camera module 102 can provide images and/or range data to navigation application 104 to support the augmented reality functionality described herein below.

In some implementations, system 100 can include server device 110. For example, server device 110 can be a computing device accessible through network 120. For example, network 120 can be a wide area network, local area network, cellular data network, wireless network, the Internet, etc.

In some implementations, server device 110 can include map server 112. For example, map server 112 can serve map data and/or route data to various client devices. For example, navigation application 104 on user device 102 can obtain map data and/or route data from map server 112 on server device 110. For example, in response to user input identifying or confirming a starting location, a destination location, and/or navigation mode (e.g., walking, driving, biking, public transit, etc.), navigation application 104 can send a routing request specifying the starting location, destination location, and/or navigation mode to map server 112 on server device 110 through network 120.

In some implementations, map server 112 can generate a route based on the starting location, destination location, and/or navigation mode and return map data and/or route data for the generated route to navigation application 104. For example, the map data for the geographic area along the generated route can include data describing road networks, points of interest, a 3D mesh representing the physical structures, and other map data, as may be described herein below. The route data can include a sequence of locations that define the generated route, navigation instructions for the generated route, AR labels for the generated and corresponding locations where AR labels may be presented, and/or other route data, as may be described herein below. After navigation application 104 receives the map data and/or route data from map server 112, navigation application 104 may present various graphical user interfaces (GUIs) for providing route guidance for the generated route to the user, as described in detail below.

Figure 2:
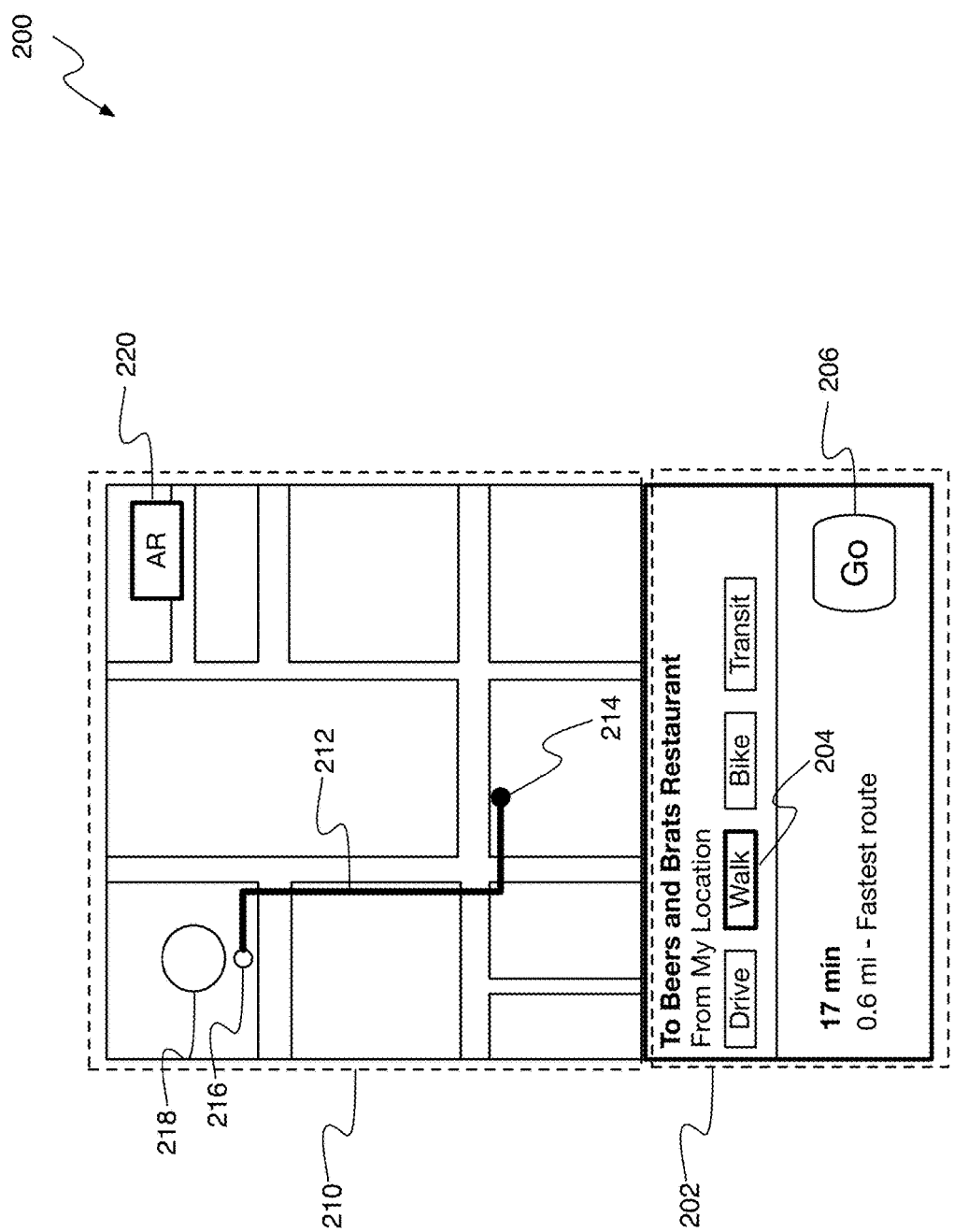
FIG. 2 illustrates an example graphical user interface for presenting an augmented reality affordance on a display of a user device.

FIG. 2 illustrates an example graphical user interface 200 for presenting an augmented reality affordance on a display of user device 102. For example, graphical user interface (GUI) 200 can be presented by navigation application 104 in response to a user providing user input requesting route from the current location of user device 102 to a destination location (e.g., "Beers and Brats Restaurant"). In response to the user input, navigation application 104 can send a routing request to map server 112 and receive map data and/or routing data describing the corresponding route generated by the server.

In some implementations, GUI 200 can include a route description placard 202. Placard 202 can include an identifier (e.g., name, address, etc.) for the destination location and/or an identifier (e.g., name, address, current location, etc.) for the starting location. Placard 202 can include graphical elements the various navigation modes (e.g., driving, walking, biking, public transit, etc.) supported by navigation application 104. For example, a user can select graphical element 204 to select walking as the navigation mode for the current route.

In some implementations, placard 202 can include graphical element 206 for invoking a turn-by-turn navigation instruction mode from the route overview mode currently presented on GUI 200. For example, the route overview mode may present a high-level view (e.g., zoomed out view) of a map representing an entire route from starting location (or current location) to destination location and may not provide specific maneuver instructions. In contrast to the route over view mode, turn-by-turn navigation mode may present a low-level map view (e.g., zoomed in view) that presents a map of the immediate environment (e.g., within a threshold distance) around user device 102 and may provide navigation instructions for specific navigation maneuvers as the user approaches a location where a maneuver should be performed to stay on the current route.

In some implementations, GUI 200 can include map view 210. For example, map view 210 can present a map of a geographic region that includes a representation of the route generated for the user (e.g., route line 212), the current location of user device 102 (e.g., current location 214), and/or the destination location specified by the user (e.g., destination location 216). Map view 210 can include graphical object 218 representing a point of interest (POI) at the destination location. For example, graphical object 218 can be an image, icon, or other graphical object that identifies the type of POI (e.g., restaurant, bar, retail shopping, etc.) at the destination location and/or the name of the POI.

In some implementations, map view 210 can include graphical element 220 for enabling an augmented reality (AR) mode of navigation application 104. Navigation application 104 can present graphical element 220 on GUI 200 when navigation application 104 receives user input selecting a supported navigation mode for traversing the current route 212. Supported navigation modes can include walking, biking, and/or public transit, for example. Unsupported navigation modes can include driving, for example. Thus, in response to receiving user input selecting graphical element 204 representing the walking mode of transportation, navigation application 104 can present graphical element 220 for enabling the AR mode of navigation application 104.

In some implementations, navigation application 104 can present an AR video stream on a display of user device 102. When the user has enabled the AR mode of navigation application 102, the user can raise the phone from a lowered, near-horizontal position (e.g., a typical position when viewing the map on user device 102) to a near-vertical, eye-level position (e.g., a typical position when using the built-in camera of user device 102) to cause navigation application 104 to present an AR video stream, as described below. For example, the AR video stream can include video images (e.g., video frames) currently being captured by camera module 106 of user device 102 and AR graphical elements (e.g., street labels, maneuver labels, POI labels, etc.) presented in the AR video stream. However, before navigation application 104 can accurately place AR graphical elements in the AR video stream, navigation application 104 may determine the precise location of user device 102 in the real-world environment.

Figure 3:
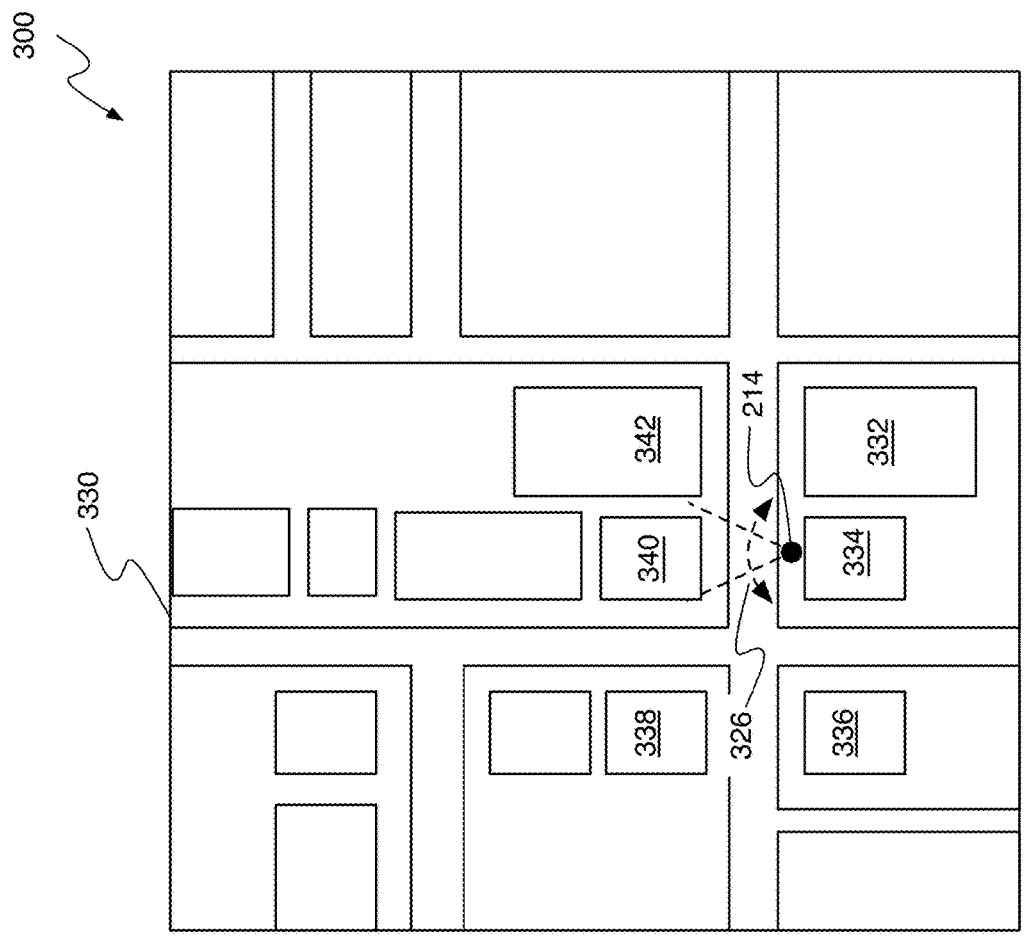
FIG. 3 is an illustration of a method for localizing a user device in a real-world environment.
Figure 3:
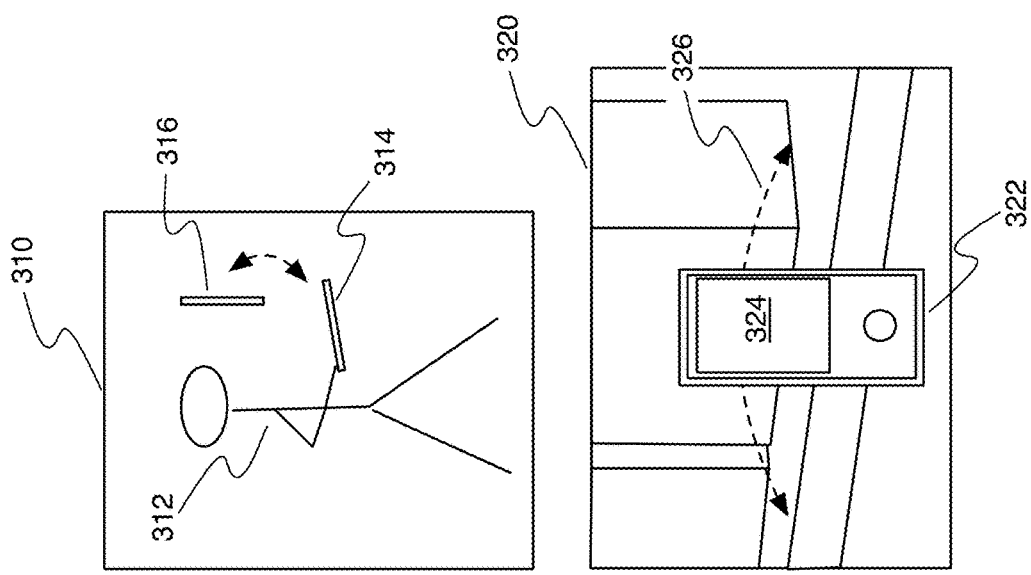

FIG. 3 is an illustration 300 of a method for localizing user device 102 in a real-world environment. Illustration 300 includes diagram 310 depicting how a user may invoke an AR video stream on user device 102. For example, as illustrated by diagram 310, a user 312 may hold a user device 102 (e.g., the rectangle in diagram 310) in a lowered, horizontal or near horizontal position 314 when viewing a map and/or navigation instructions presented by navigation application 104 on a display of user device 102. When the user has enabled the AR mode of navigation application 104 (e.g., by previously selecting graphical element 220 of FIG. 2), the user may raise user device 102 to an elevated, vertical or near vertical position 316. The various motion sensors of user device 102 can detect this movement raising user device 102. Navigation application 104 can invoke and/or present the AR video stream in response to user device 102 detecting that user device 102 has been raised to position 316. Navigation application 104 can exit out of the AR video stream and return to presenting the map and navigation instructions (e.g., as illustrated by FIG. 2) when user device 102 detects that user device 102 has been lowered back down to a horizontal or near horizontal position similar to position 314.

The raising and lowering movement detected by user device 102 can be considered user input to navigation application 104 for invoking and exiting the AR video stream. Other affordances for receiving user input can be provided by navigation application 104. For example, in some implementations, user selection of graphical element 220 of FIG. 2 may cause the AR video stream to be presented by navigation application 104 instead of simply enabling the AR mode of navigation application 104. Similarly, a graphical element can be presented along with the AR video stream that when selected will cause navigation application 104 to exit the AR video stream. In some implementations, physical buttons of user device 102 can be configured for and manipulated to present and exit the AR video stream.

In some implementations, navigation application 104 can present an AR video stream on the display of user device 102 in response to detecting user input invoking the AR video stream. For example, navigation application 104 can present a graphical user interface that presents a video stream received from camera module 106 configured on the back (e.g., opposite the face of user device 102 that includes the display) of user device 102. Navigation application 104 can embed or present AR graphical elements (e.g., AR labels, AR objects, etc.) at locations within the video stream to make it appear that the AR graphical elements are in the real-world environment captured in the video stream. The combination of the live video stream and the embedded AR elements comprise the AR video stream.

In some implementations, navigation application 104 can localize user device 102 within the real-world environment when the AR video stream is invoked. For example, to accurately place AR graphical elements in the AR video stream, navigation application 104 needs to determine the precise real-world location of user device 102. The localization process can be performed every time the AR video stream is invoked. The localization process can be performed when a threshold period of time has passed since the previous localization process was performed. The localization process can be performed when user device 102 has moved a threshold distance from where the previous localization process was performed.

In some implementations, navigation application 104 can localize user device 102 by scanning the local environment to determine a precise location of user device 102 in the local environment. For example, when generating a navigation route, navigation application 104 can determine a location of user device 102 using a location determining subsystem of user device. This location determining subsystem can, for example, use satellite signals, cellular signals, WiFi signals, etc. to determine the location of user device 102 within a margin of error (e.g., 100 feet, 50 feet, 10 feet, etc.). However, to accurately place AR labels in the AR video stream, navigation application 104 should have a more precise location of user device 102 in the local real-world environment. To obtain this more precise location (e.g., to localize user device 102 in the local environment), navigation application 104 can, in response to detecting that the user has raised user device 102 to position 316, present a prompt on the display of user device 102 instructing the user to scan the local real-world environment using a camera of user device 102. For example, diagram 320 and diagram 330 illustrate the scanning process.

Diagram 320 illustrates user device 322 (e.g., user device 102) being held in a raised, vertical or near vertical position (e.g., position 316) with a street and buildings in the background. The camera module 106 of user device 322 can capture images of the street and buildings in the background and present a video stream 324 of the images on a display of user device 322. Navigation application 104 can present a prompt instructing the user to scan the local environment with the camera by panning user device 322 to the right and left, as illustrated by dashed arrow 326. While the user is moving user device 322 to scan the local environment, the range finding sensor of user device 322 can determine ranges (e.g., distances) between user device 322 and various objects in the local environment.

Diagram 330 illustrates user device 322 (e.g., user device 102) scanning buildings in the local real-world environment. For example, user device 322 may be located (e.g., using the location determining subsystems of user device 102) at current location 214 on a street within a city and surrounded by buildings 322-342. When navigation application 104 scans the local environment with the range finding sensor of user device 102, navigation application 104 can determine the distances between user device 322 and various points on buildings 322-342. The distances between the location of user device 103 can the points on the buildings can be used to generate a three-dimensional (e.g., 3D) mesh model of the local environment. The 3D mesh (e.g., scanned, generated 3D mesh) can be compared to a 3D mesh (e.g., map data 3D mesh) of the local environment received in map data from map server 112 to determine a precise location and/or orientation (e.g., direction where camera is pointing, field of view of camera, etc.) of user device 322 in the map data. After determining the precise location of user device 322 (e.g., user device 102) in the map data, navigation application 104 can determine where to present AR graphical elements in the AR video stream and whether the AR graphical elements are within the field of view of the camera of user device 322 based on the precise location and/or orientation determined for user device 322.

Figure 4:
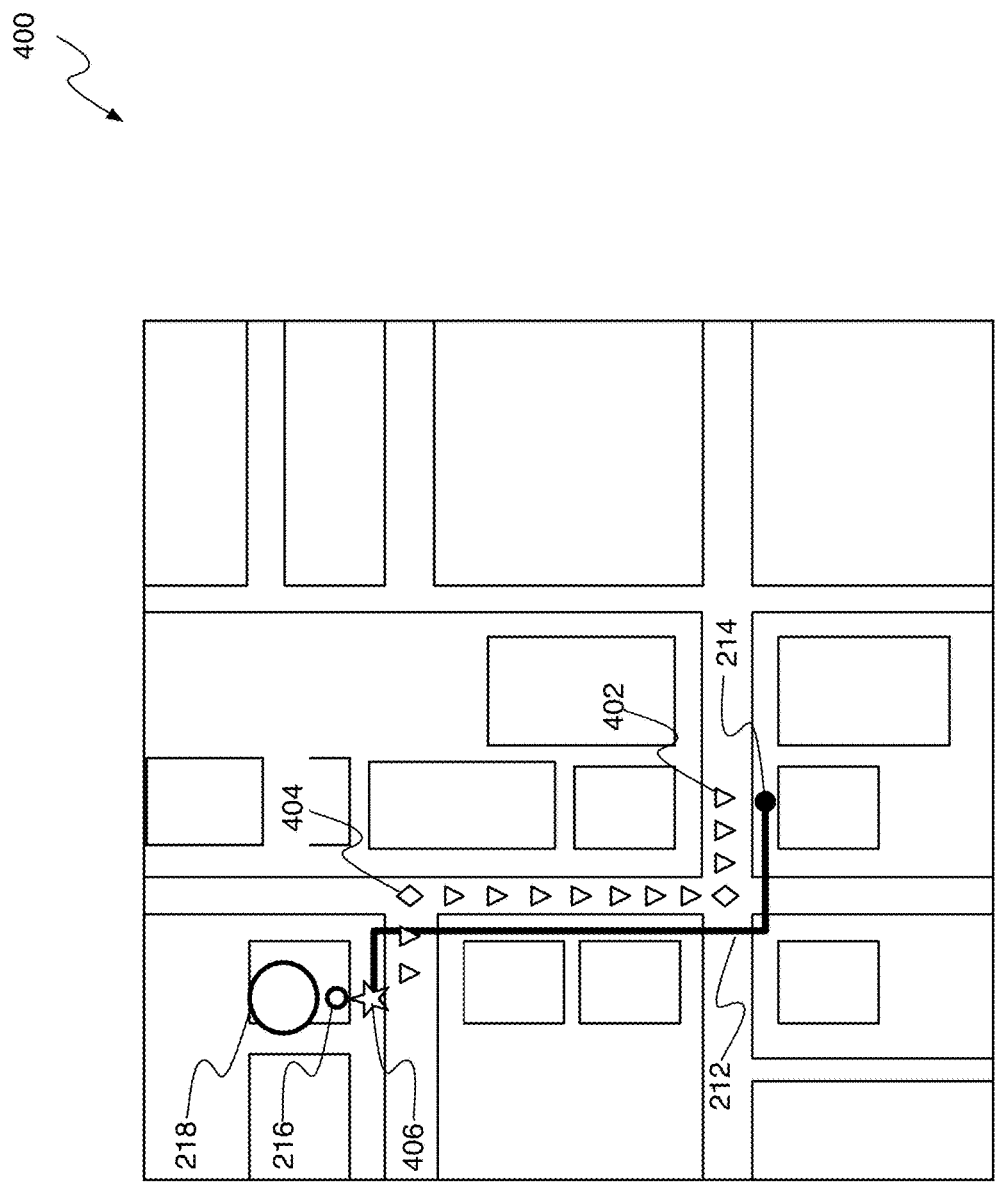
FIG. 4 is an illustration depicting label placement locations for AR labels along a route.

FIG. 4 is an illustration 400 depicting label placement locations for AR labels along a route. For example, when navigation application 104 requests a route from map server 112, map server 112 will generate a route from the starting location for the route to the destination location for the route. Map server 112 will generate route data for the route, including navigation instructions for the route that identify locations along the route, roads, maneuvers, distances, etc., for the route.

In some implementations, to support the AR video stream functionality provided by navigation application 104, map server 112 can include AR labels in the route data for the route. The AR labels can include continuation labels. For example, continuation labels can identify a road and/or direction to continue traveling along the route. The AR labels can include maneuver labels. For example, the maneuver labels can identify a new road that the user should take along the route, a graphical representation of the maneuver (e.g., a turn arrow), or other information indicating the maneuver the user should perform. The AR labels can include a destination label. For example, the destination label can identify the point of interest, address, or other identifying information for the destination location. The destination label can include a graphical object (e.g., sphere, 3D icon, etc.) representing the destination, for example.

In some implementations, map server 112 can determine a location for placing an AR label along the generated route. For example, each AR label in the map data generated by map server 112 can have a corresponding geographic location where the AR label should be presented.

Referring to FIG. 4, continuation labels locations (e.g., represented by triangle shapes), maneuver label locations (e.g., represented by diamond shapes), and the destination label location (e.g., represented by the star shape) can be mapped out along the route. In some implementations, continuation label and/or maneuver label locations can be located on centerline of a road near (e.g., nearest to, adjacent to, parallel to, etc.) the route. The destination label location can be located outside and near the entrance of a building or structure corresponding to the destination. For example, destination label location 406 can be located outside the door of the business corresponding to destination 216. The AR labels (e.g., continuation labels, maneuver labels, destination label, etc.) and their corresponding locations can comprise a sequence of AR labels along the route from the starting location 214 to the destination location 406. Map server 112 can send the sequence of labels to navigation application 104 in the route data for the generated route.

In some implementations, navigation application 104 can select an AR label to present in an AR video stream based on various criteria. In some implementations, when presenting AR labels for an active route, navigation application 104 may select an AR label in the sequence of AR labels for the route to present to the user based the criteria described herein. For example, an active route can be the route presented on GUI 200, a route for which navigation application 104 is currently providing navigation instructions and/or guidance, a route the user is currently travelling, etc. In some implementations, navigation application 104 can select and present only one AR label. In some implementations, navigation application 104 can select and present multiple AR labels.

In some implementations, the AR label selection criteria can include the whether the location of the AR label is ahead or behind of the location of user device 102 in the route. For example, locations that are ahead on the route can include AR label locations between the current location 214 of user device 102 and destination location 406 along the route. Locations that are behind on the route are AR label locations that are located between the current location 214 of user device 102 and a previous location of user device 102 along the route. Thus, as a user (e.g., user device 102) moves along a route toward destination location 406 and passes AR label locations along the route, the AR labels corresponding to the label locations that the user has already passed along the route can be excluded from a list of candidate AR labels to be presented by navigation application 104 in the AR video stream. The AR labels corresponding to the label locations that the user has not already passed along the route can be added to the list of candidate AR labels to be presented by navigation application 104 in the AR video stream.

In some implementations, the AR label selection criteria can include a maximum distance between user device 102 and AR label locations. For example, navigation application 104 can be configured with a maximum distance value for determining candidate AR labels for presentation in the AR video stream. Any AR labels that have corresponding locations that are farther away from user device 102 than the maximum distance value can be removed from the list of candidate AR labels.

In some implementations, the AR label selection criteria can include a minimum distance between user device 102 and AR label locations. Navigation application 104 can be configured with a minimum distance value for determining candidate AR labels for presentation in the AR video stream. Any AR labels that have corresponding locations that are nearer to user device 102 than the minimum distance value can be removed from the list of candidate AR labels.

In some implementations, the AR label selection criteria can include whether a clear line of sight exits between user device 102 and a candidate AR label location. For example, an object in the local environment of user device 102 interferes with (e.g., wholly or partially obscures, obstructs, etc.) a clear line of sight between the current location of user device 102 and a candidate AR label's location, then the candidate AR label can be removed from the list of candidate AR labels. Clear, unobstructed, line of sight can be determined by drawing rays, lines, etc., from the current location of user device 102 to various points on candidate AR label at a corresponding label location. If any point on the candidate AR label is obstructed by an object (e.g., a building, the ground, other structures, etc.), then there is not a clear line of sight to the AR label from the current location of user device 102. Specific examples of determining clear line of sight are described with reference to FIG. 5 and FIG. 6 below.

In some implementations, a clear line of sight may not be a criterion considered when determining which AR label to present in an AR video stream. For example, an AR label may be selected when the AR label is partially, or totally, obscured by a building, the ground, or other map object or surface. In this case, when the selected AR label is obscured, the opacity of the obscuring object may be adjusted to allow the selected AR label to be viewed through the obscuring object (e.g., building, ground, other map object). For example, the opacity of a building may be reduced to allow the user to view the selected AR label through the building while allowing the user to still see that the building is between the user's location and the selected AR label.

In some implementations, the AR label selection criteria can include evaluation of priorities associated with each AR label type. For example, AR labels for a route (e.g., route 212) can include continuation labels (e.g., represented by triangle 402), maneuver labels (e.g., represented by diamond 404), and/or destination labels (e.g., represented by star 406). Each of these label types (e.g., continuation, maneuver, destination, etc.) can have a corresponding priority. For example, destination labels can have the highest priority, maneuver labels can have a medium priority, and continuation labels can have the lowest priority. Navigation application 104 can select the highest priority label that is clearly visible from the current location of user device 102. For example, after AR labels that are not clearly visible from the current location of user device 102 are removed from the candidate list of AR labels, navigation application 104 can select an AR label from the candidate list of labels that has the highest priority. For example, if user device 102 has a clear line of sight to destination label location 406, then navigation application 104 can select the destination AR label. If the destination label is not clearly visible from the current location of user device 102 but the maneuver label location 404 is clearly visible, then navigation application 104 can present the maneuver label at location 404. If no destination labels or maneuver labels are clearly visible, then navigation application 104 can present a continuation label.

In some implementations, the AR label selection criteria can include determination of the closest candidate AR label. As illustrated by FIG. 4, a sequence of labels for a route may have multiple labels of the same type and/or same priority. There may be many continuation label locations and/or many maneuver locations along route 212, thus there may be many clearly visible candidate labels with the same priority. In this case, navigation application 104 can select the highest priority, clearly visible candidate label that has a corresponding location that is closest to the current location of user device 102 for presentation in the AR video stream.

Figure 5:
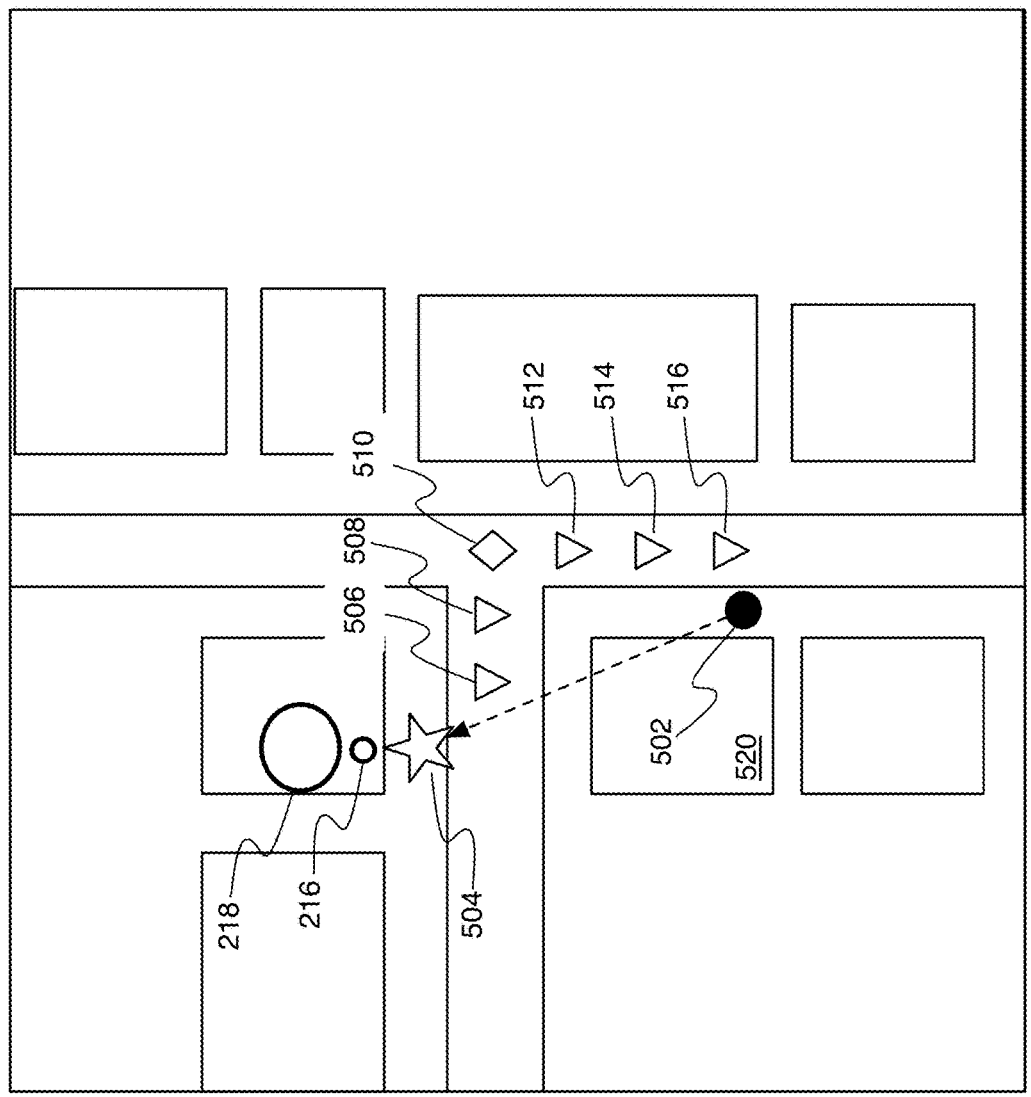
FIG. 5 is an illustration depicting obstruction of an AR label by a building.

FIG. 5 is an illustration 500 depicting obstruction of an AR label by a building. For example, the distance between destination AR label at location 504 and user device 102 at current location 502 may be within the maximum distance for label selection, as described above. The destination label at location 502 is also the highest priority label of the candidate labels at locations 504-516 along the route. Thus, if user device 102 at current location 502 has a clear line of sight to the destination label location 504, the destination AR label would be selected for presentation in the AR video stream. However, when navigation application 104 extends a ray (e.g., straight line) from current location 502 of user device 102 to destination label location 504, navigation application 104 can determine that building 520 obscures the destination label when viewed from location 502. Navigation application 104 can make this determination using the 3D mesh model of the local environment surrounding user device 102 received from map server 112, as described above. When navigation application 104 determines that at least one of the rays extending from location 502 to the various points on the destination label intersects the 3D mesh representing the surface of building 520, then navigation application 104 can determine that user device 102 does not have a clear line of sight from location 502 to the destination label and exclude the destination label from the candidate list of AR labels, as described above. While the discussion above specifically describes determining that a building is obstructing a clear line of sight to a destination label location, the same or similar process can be used to determine whether a clear line of sight exists between the current location of user device 102 and any other AR label location (e.g., AR label locations 506-516).

In some implementations, navigation application 104 may adjust the opacity of map objects that interfere with a clear line of sight to a selected AR label. For example, there may not be any candidate AR labels, or label locations, to which navigation application 104 can fall back. The selected and obscured destination label, or other label, may be the candidate label nearest the user's current location along the current path. In this case, when the selected AR label is obscured and no fall back location or label is available, the opacity of the obscuring object may be adjusted to allow the selected AR label to be viewed through the obscuring object (e.g., building, ground, other map object). For example, the opacity of a building may be reduced to allow the user to view the selected AR label through the building while allowing the user to still see that the building is between the user's location and the selected AR label.

Figure 6:
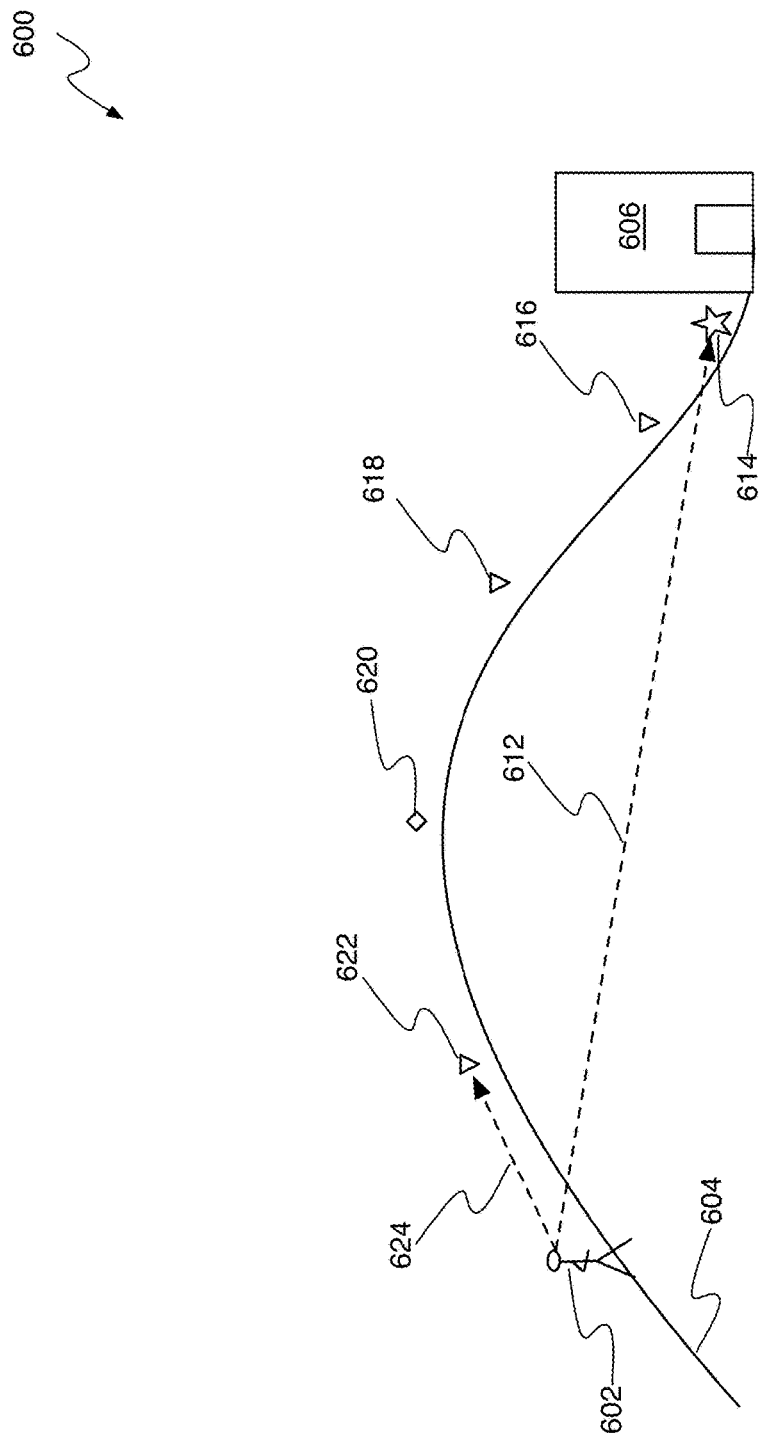
FIG. 6 is an illustration depicting obstruction of an AR label by the ground.

FIG. 6 is an illustration 600 depicting obstruction of an AR label by the ground. For example, the distance between destination AR label at location 614 and user device 102 at current location 602 may be within the maximum distance for label selection, as described above. The destination label at location 614 is also the highest priority label of the candidate labels at locations 614-622 along the route. Thus, if user device 102 at current location 602 has a clear line of sight to the destination label location 614, the destination AR label at location 614 would be selected for presentation in the AR video stream. However, when navigation application 104 extends a ray (e.g., straight line) from current location 502 of user device 102 to destination label location 504, navigation application 104 can determine that ground 604 obscures the destination label when viewed from location 502. Navigation application 104 can make this determination using the 3D mesh model of the local environment, including the ground, surrounding user device 102 received from map server 112, as described above. When navigation application 104 determines that at least one of the rays 612 extending from location 502 to the various points on the destination label intersects the 3D mesh representing the surface of ground 604, then navigation application 104 can determine that user device 102 does not have a clear line of sight from location 602 to the destination label location 614 and exclude the destination label from the candidate list of AR labels, as described above.

Alternatively, navigation application 104 can use elevation information associated with each of the AR label locations 614-624 between the current location 602 of user device 102 and the location 614 of the destination label to determine whether a clear line of sight from current location 602 to the destination label location 614 exists. For example, if at least one of the AR label locations 614-624 (or any location) between the current location 602 of user device 102 and destination label location 614 has an elevation that is higher (e.g., greater) than the elevations of both current location 602 and destination label location 614, then navigation application 104 can determine that a clear line of sight does not exist between current location 602 of user device 102 and destination label location 614. While the discussion above specifically describes determining that the ground is obstructing a clear line of sight to a destination label location, the same or similar process can be used to determine whether a clear line of sight exists between the current location of user device 102 and any other AR label location (e.g., AR label locations 616-622).

Figure 7:
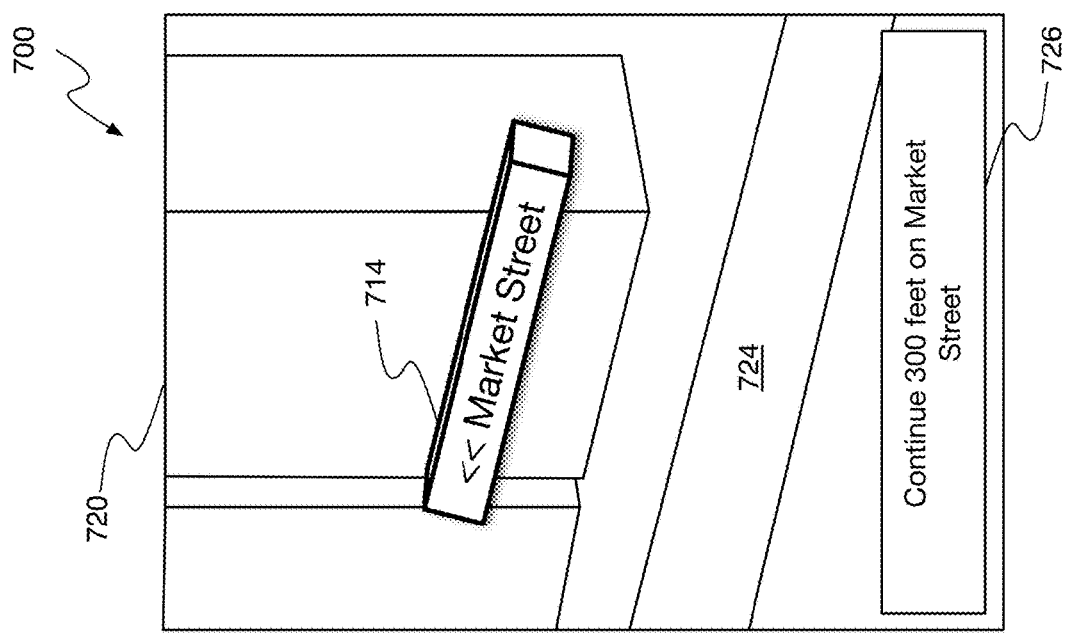
FIG. 7 is an illustration depicting AR label orientation in an AR video stream.
Figure 7:
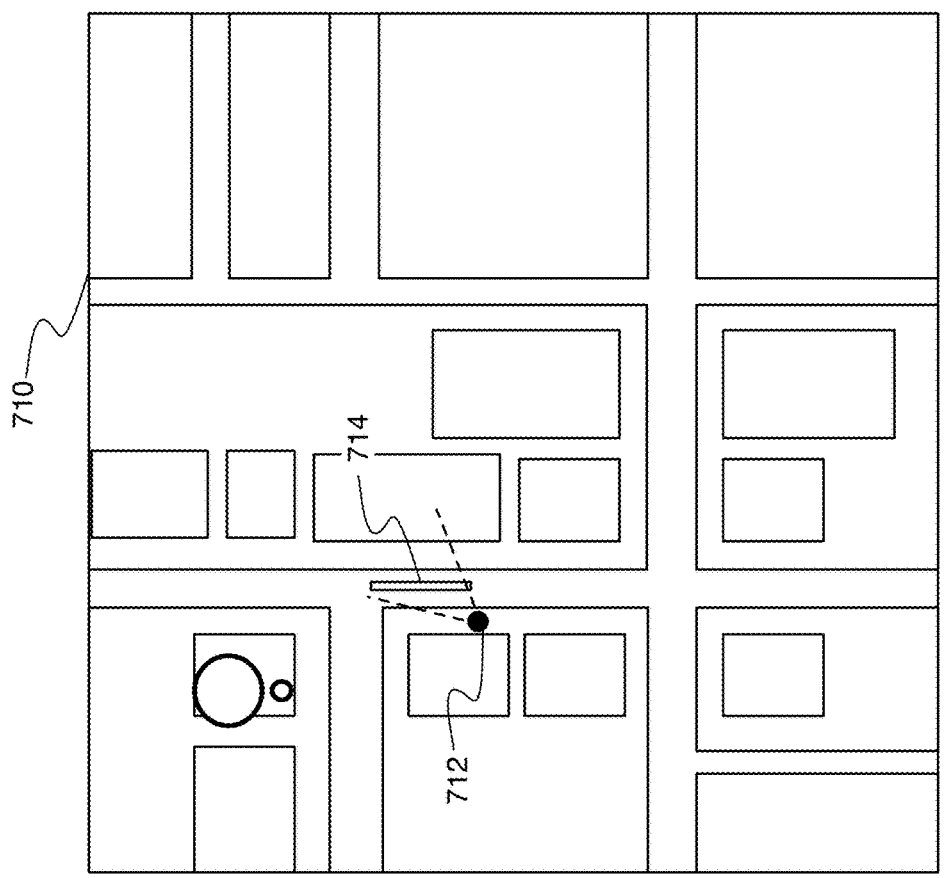

FIG. 7 is an illustration 700 depicting AR label orientation in an AR video stream. For example, illustration 700 includes diagram 710 showing the placement of an AR label 714 at a map location specified by route data received from map server 112 for a route requested by a user of user device 102. The dashed lines extending from current location 712 of user device 102 indicate the orientation of user device 102 and the perspective captured by the camera(s) of camera module 106. For example, since the camera(s) of user device 102 are directed toward the location of AR label 714, AR label 714 can be inserted into the AR video stream 720 presented by navigation application 104 on a display of user device 120. AR label 714 was selected for presentation in the AR video stream 720 by navigation application 104 using the AR label selection criteria and/or process described above and in further detail below.

As the user moves user device 102, navigation application 104 can adjust the placement of AR label 714 within the AR video stream on the display of user device 102 based on motion data describing the movement of user device 102. For example, when the user changes the orientation of the camera(s) of user device 102 in the real-world environment, navigation application 102 can adjust the placement of AR label 714 in the frames of the AR video stream 720 so that AR label 714 appears to maintain its position with reference to the real-world environment. When the user moves user device 102 to the left or right, for example, the movement can cause the AR video stream 720 to appear to pan left or right, the motion sensors of user device 102 can detect the movement and send motion data describing the movement to navigation application 104. Navigation application 104 can adjust the position of AR label 714 within the video frames of AR video stream 720 based on the movement data so that AR label appears to stay at the same position within the real-world environment.

In some implementations, AR label 714 can be a three-dimensional label. For example, AR label 714 can appear as a 3D street sign. AR label 714 can appear as a string of 3D characters representing street names, point of interest identifiers, business names, or other meaningful text relevant to navigating the current route. In some implementations, AR label 714 can include 3D direction indicators (e.g., arrows, chevrons, etc.) that can indicate to the user the appropriate direction of travel along the route. In some implementations, AR label 714 can be a 2-dimensional label.

In some implementations, AR label 714 can be oriented parallel to the road 724 identified by AR label 714. For example, the face of AR label 714 where the characters are easily read can be directed to the edge of the corresponding road 724 length of the string of characters runs along parallel with the road 724 (e.g., as opposed to running across the road 724).

In some implementations, navigation application 104 can present navigation instructions when presenting AR video stream 720. For example, navigation application 104 can present graphical element 726 (e.g., a banner, overlay, etc.) that includes navigation instructions guiding the user along the current route.

Figure 8:
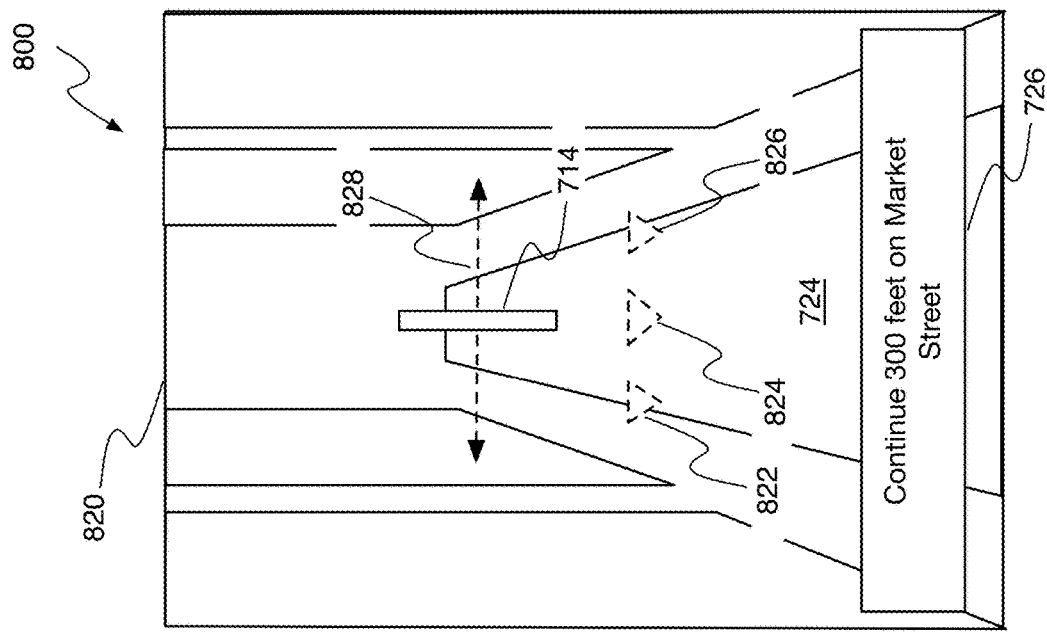
FIG. 8 is an illustration depicting adjusting the location of an AR label in an AR video stream based on a current location of a user device.
Figure 8:
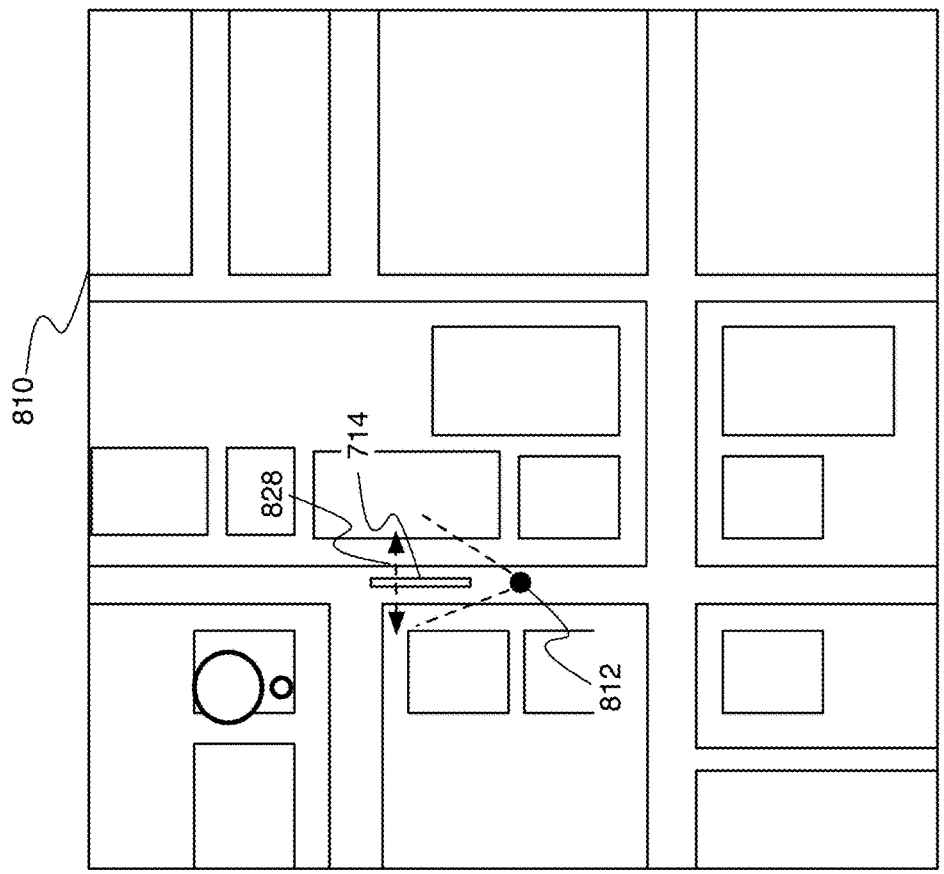

FIG. 8 is an illustration 800 depicting adjusting the location of an AR label in an AR video stream based on a current location of user device 102. For example, user device 102 can sometimes be in locations that create a perspective of an AR label that makes it difficult for a user to obtain information from the AR label. Navigation application 104 can adjust (e.g., offset) the presentation location of the AR label from the assigned location of the AR label in the route data when user device 102 is at an angle with respect to the face of the AR label that makes it difficult for the user to read the AR label. For example, when user device 102 is in line with the edge of the AR label, the user may not be able to read the face of the AR label when the AR label is presented in the AR video stream.

As described above, an AR label can be a three-dimensional object. The AR label can have a face and a back. For example, the face and the back can be the informational surfaces of the AR label that describe a street, POI, or other information. The face and back can have a vertical orientation, face the edge of the street, and/or run parallel to the street, as described above. The AR label can have top and bottom surfaces, where the bottom surface faces down toward the street, or ground, and the top surface faces up toward the sky. The top and bottom surfaces can run parallel with the underlying street, for example. The AR label can have surfaces at the edges of the label. When looking at the face of the label, the edges will be the surfaces at the right and left ends of the label. The edge surfaces can have a vertical orientation. The edge surfaces can face down a street or road in either direction. Stated differently, the edge surfaces can be oriented perpendicular to the surface of the underlying road.

Illustration 700 includes diagram 810 showing the placement of an AR label 714 at a map location specified by route data received from map server 112 for a route requested by a user of user device 102. The dashed lines extending from current location 812 of user device 102 indicate the orientation of user device 102 and the perspective captured by the camera(s) of camera module 106. For example, since the camera(s) of user device 102 are directed toward the location of AR label 714, AR label 714 can be inserted into the AR video stream 820 presented by navigation application 104 on a display of user device 120. AR label 714 was selected for presentation in the AR video stream 720 by navigation application 104 using the AR label selection criteria and/or process described above and in further detail below.

In some implementations, navigation application 104 can determine that a current location 812 of user device 102 is aligned with an edge of the AR label 714 selected for presentation in the AR video stream 820. The camera perspective from current location 812 to the location of AR label 714 would cause navigation application 104 to present an edge view of AR label 714 in the AR video stream 720, as illustrated by FIG. 8, since AR label 714 has an orientation that runs along the underlying road with informational elements facing the edge of the road, as described above. Since the edge of label 714 provides no information other than showing the existence of a label at corresponding label location, the AR label 714 presented in AR video stream 714 in this orientation is not very helpful to the user of user device 102 when the user is trying to find his or her way along a route.

In some implementations, when navigation application 104 determines that user device 102 is located at the edge of AR label 714, navigation application 104 can shift the presentation location of AR label 714 in AR video stream 820. For example, AR label 714 can initially be presented at location 824 (e.g., dashed triangles are for reference and not presented in the AR video stream) according to the route data received from map server 112. When navigation application 104 determines that current location 812 of user device 102 is located at the edge of AR label 714, navigation application 104 can shift AR label 714 to a location 822 or location 826 offset a distance from initial location 824. This movement, as indicated by dashed arrows 828, to location 822 or location 826 can provide a perspective of AR label 714 that allows navigation application 104 to present at least a portion of an informational face of AR label 714 in the AR video stream. For example, even if AR label 714 is not completely legible from the adjusted position of AR label 714, the user will be able to see that the object presented in AR video stream 820 is an AR label and the user may, therefore, be prompted to adjust the current location of user device 102 to view the AR label more clearly.

In some implementations, when offsetting AR label 714 to location 822 or 826, navigation application 104 may slightly rotate or pivot AR label 714 to allow presentation of the informational front face of AR label 714. For example, navigation application 104 may rotate AR label 714 around a vertical axis of AR label 714 to allow more of the informational face of AR label 714 to be presented in the AR video stream 820.

Figure 9:
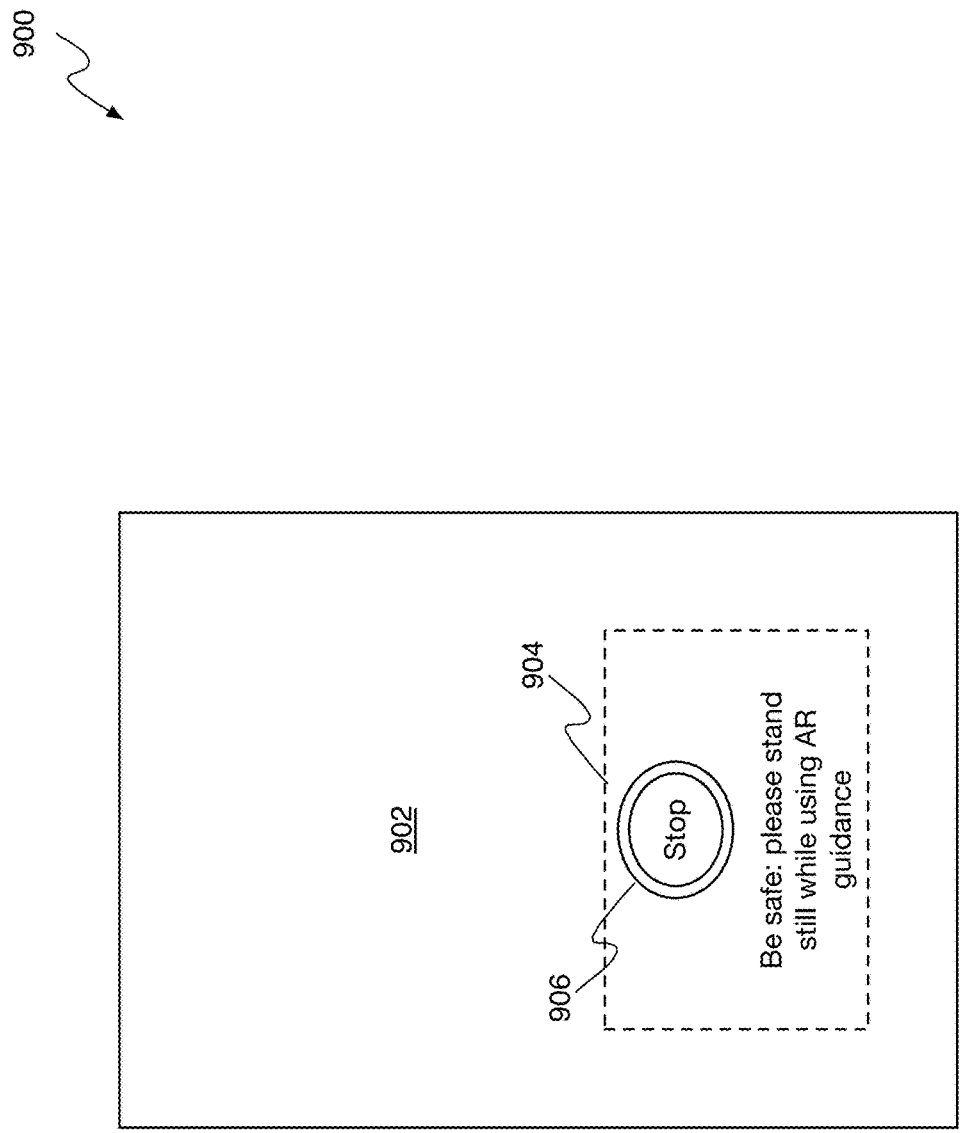
FIG. 9 illustrates an example graphical user interface for prompting the user to remain still while using the AR navigation features of the navigation application.

FIG. 9 illustrates an example graphical user interface 900 for prompting the user to remain still while using the AR navigation features of navigation application 104. For example, if a user continues looking at user device 102 and/or an AR video stream presented by user device 102 while also trying to walk, bike, etc., the user may injure themselves by running into objects (e.g., a pole, a car, a building, etc.) on the street. To prevent such injuries, navigation application 104 can prevent the user from viewing the AR video stream when the user begins moving while the AR video stream is being presented. For example, while presenting the AR video stream on a display of user device 102, navigation application 104 can detect that the user has begun moving (e.g., walking, biking, etc.). When the user has moved more than a first threshold amount (e.g., a threshold number of steps, a threshold distance, a threshold amount of time, etc.), navigation application 104 can present a warning prompt (e.g., prompt 904) requesting or indicating that the user stop moving while user device 102 is presenting the AR video stream.

Prompt 904 can include graphical element 906 that represents a timer that counts down until navigation application 104 will obscure the AR video stream on the display of user device 102. For example, graphical element 906 can have the appearance of a ring. When navigation application 104 detects that the user has started moving (e.g., walking, biking, etc.) while the AR video stream is being presented, navigation application 104 can start a warning timer (e.g., a 5 second timer, 10 second timer, 3 second timer, etc.) that counts down while the user continues moving. When the warning timer expires (e.g., reaches zero), navigation application 104 can blur the AR video stream. As the warning counter is counting down, navigation application 104 can update the appearance of graphical element 906 (e.g., gradually fill in the ring) to represent the progress of the warning timer. If the user stops moving before the warning timer expires, navigation application 104 can present an unobscured AR video stream on a display of user device 102.

In some implementations, navigation application 104 can obscure the AR video stream presented on user device 102. For example, when the warning timer described above expires, navigation application 104 can present a blurred AR video stream 902 to make the AR video stream unusable for the user and discourage the user from looking at the AR video stream while moving. In some implementations, navigation application 104 may not obscure the AR video stream. For example, navigation application 104 may present a warning prompt requesting that the user stop moving but navigation application 104 may not blur the AR video stream or otherwise prevent the user from viewing the AR video stream while moving (e.g., walking, biking, etc.).

In some implementations, when presenting the obscured AR video stream, navigation application 104 can present a prompt 904 to the user requesting that the user remain still while using the AR video stream. For example, navigation application 104 can continue to present prompt 904 requesting that the user stop moving and/or stand still while using the AR video stream. Navigation application 104 can start a second warning timer and update graphical element 906 to represent the progress of the timer as the timer counts down while the blurred AR video stream is presented. If the user stops moving before the second timer expires, navigation application 104 can present an unobscured AR video stream on a display of user device 102.

In some implementations, when the user continues to move after the expiration of the second warning timer, navigation application 104 can terminate the AR video stream and return to a map presentation. For example, when the user does not stop moving after navigation application 104 obscures the AR video stream and/or presents prompt 904, navigation application 104 can terminate the AR video stream and present a map view on the display of user device 102, such as the route overview presentation of GUI 200 in FIG. 2. In some implementations, navigation application 104 can terminate the AR video stream and present a map view on the display of user device 102, such as the route overview presentation of GUI 200 in FIG. 2, when the user lowers user device 102 to a lowered, horizontal or near horizontal position, as described above.

In some implementations, navigation application 104 may require the user of user device 102 to perform the localization process when invoking the AR video stream after navigation application 104 has presented the map view on the display of user device 102. For example, if user device 102 has moved more than a threshold amount (e.g., a threshold distance, a threshold amount of time, etc.) or a threshold amount of time has passed since the previous localization was performed, navigation application 104 can require the user to perform the localization process described above so that navigation application 104 can determine the precise location of user device 102 within the local environment when generating and/or presenting the AR video stream, as described above.

Figure 10:
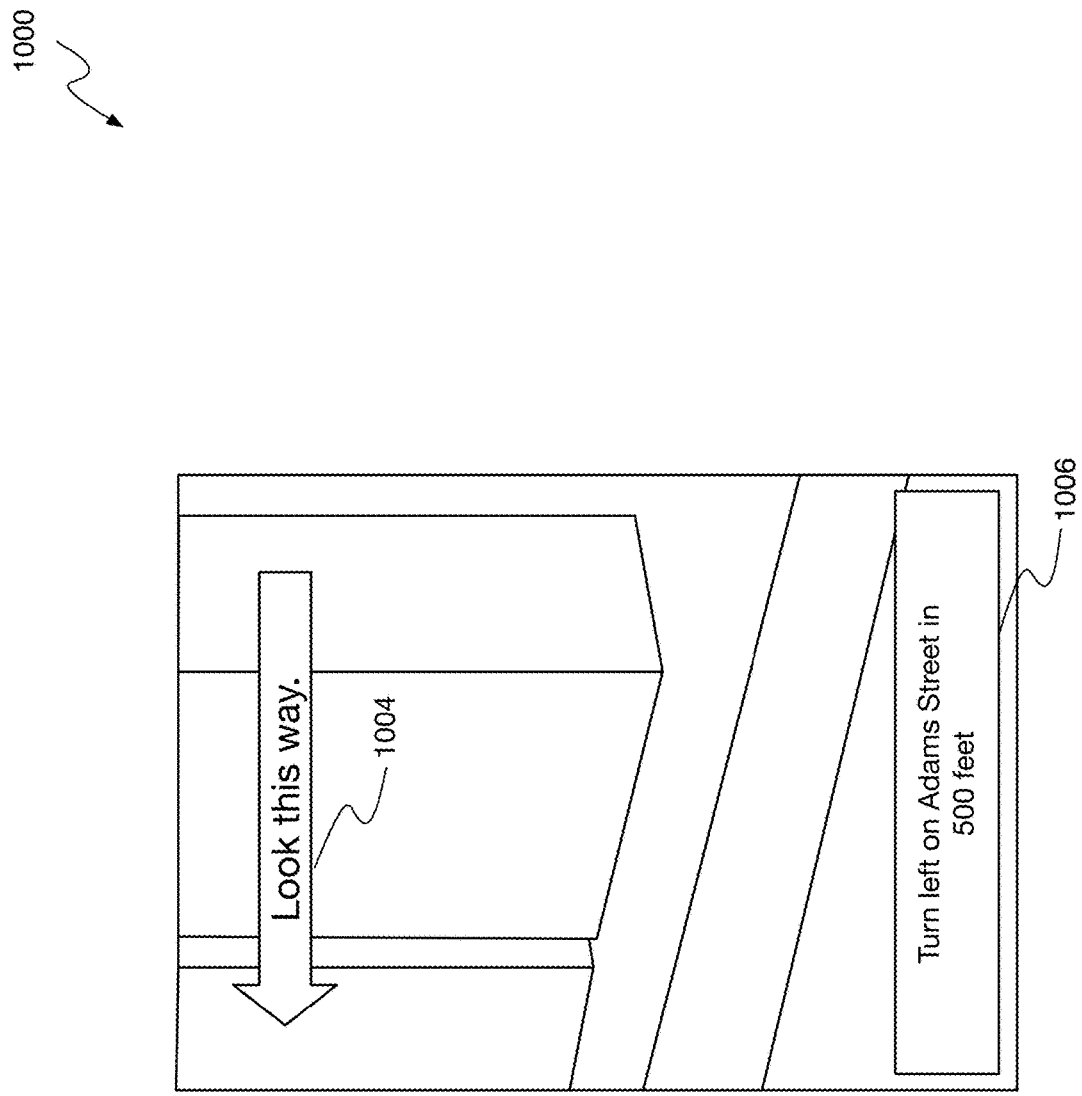
FIG. 10 illustrates an example graphical user interface for presenting a prompt to change the orientation of a user device when presenting an AR video stream.

FIG. 10 illustrates an example graphical user interface 1000 for presenting a prompt to change the orientation of user device 102 when presenting an AR video stream. For example, navigation application 104 can determine that the camera of user device 102 are not currently directed at the location of the AR label selected for presentation by navigation application 104 in the AR video stream presented by GUI 1000. Navigation application 104 can make this determination based on the localization process, described above, and the detected movements of user device 102. Navigation application 104 can determine the direction the camera is pointing (e.g., the field of view of the camera), determine the position of the selected AR label with respect to the field of view of the camera, and present a prompt 1004 instructing the user on how to adjust the orientation of user device 102 so that the selected AR label will be presented in the AR video stream. For example, navigation application 104 can present prompt 1004 instructing the user to point the camera at the geographic location associated with the route AR label.

In some implementations, prompt 1004 can be a 3D AR label or a two-dimensional element (e.g., a banner, overlay, etc.), such as graphical element 1006. When presented as an AR label, prompt 1004 may not be anchored to any geographic location, unlike route AR labels that are associated and/or anchored to a particular geographic location along a route. Thus, prompt 1104 may remain at a fixed location on the display of user device 102 until the selected route AR label is presented in the AR video stream or until a different prompt is required to instruct the user to change the orientation of user device 102.

Figure 11:
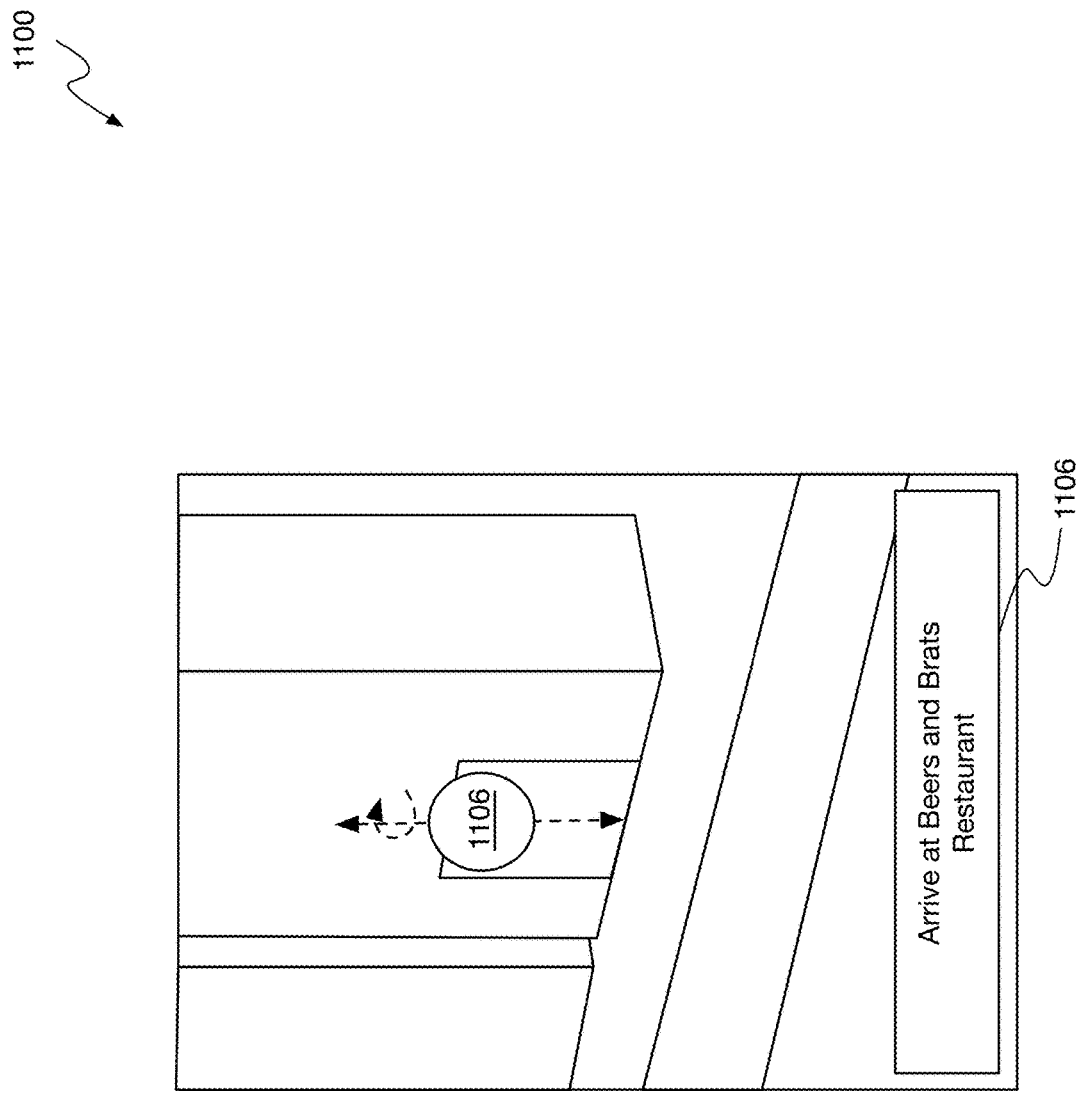
FIG. 11 illustrates an example graphical user interface for presenting a destination reached animation.

FIG. 11 illustrates an example graphical user interface 1100 for presenting a destination reached animation. For example, GUI 1100 can be presented by navigation application 104 in response to detecting that user device 102 has arrived at the destination associated with a route currently being traversed by the user of user device 102. For example, navigation application 104 can present destination AR label 1106 in an AR video stream presented on GUI 1100 when destination AR label 1106 satisfies the AR selection criteria described above. The destination AR label 1106 can be presented at the entrance of the building, or other structure, associated with the destination location. The destination AR label 1106 can be presented on the same side of the street as the destination location to make clear what side of the nearby street the user should use to reach the destination location.

In some implementations, destination AR label 1106 can be a 3D label. For example, destination AR label 1106 can be a 3d sphere, oval, puck, or other three-dimensional shape. Destination AR label 1106 can have an appearance that represents the destination location and/or category associated with the destination location. For example, when presenting different categories of points of interest (POIs), navigation application 104 may use different colors to represent different categories (e.g., restaurants, retail shopping, parks, etc.) of POIs. Destination AR label 1106 can be colored according to the type of POI associated with the destination location.

When destination AR label 1106 is initially presented, destination AR label 1106 may be a still label (e.g., stationary, fixed, not animated, etc.). However, when user device 102 moves within a threshold distance of the destination of the current route, navigation application 104 may animate destination AR label 1106 to celebrate the arrival of the user at the destination location. The animation can cause destination AR label 1106 to appear to bounce up and down and/or spin around a vertical axis, as indicated by the dashed arrows of FIG. 11.

In some implementations, navigation application 104 can present graphical element 1106 (e.g., a banner, overlay, etc.) on GUI 1100. For example, graphical element 1106 can indicate the arrival of the user at the destination location and/or present an identifier for the destination location (e.g., a name for the point of interest, a street address, etc.).

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 12:
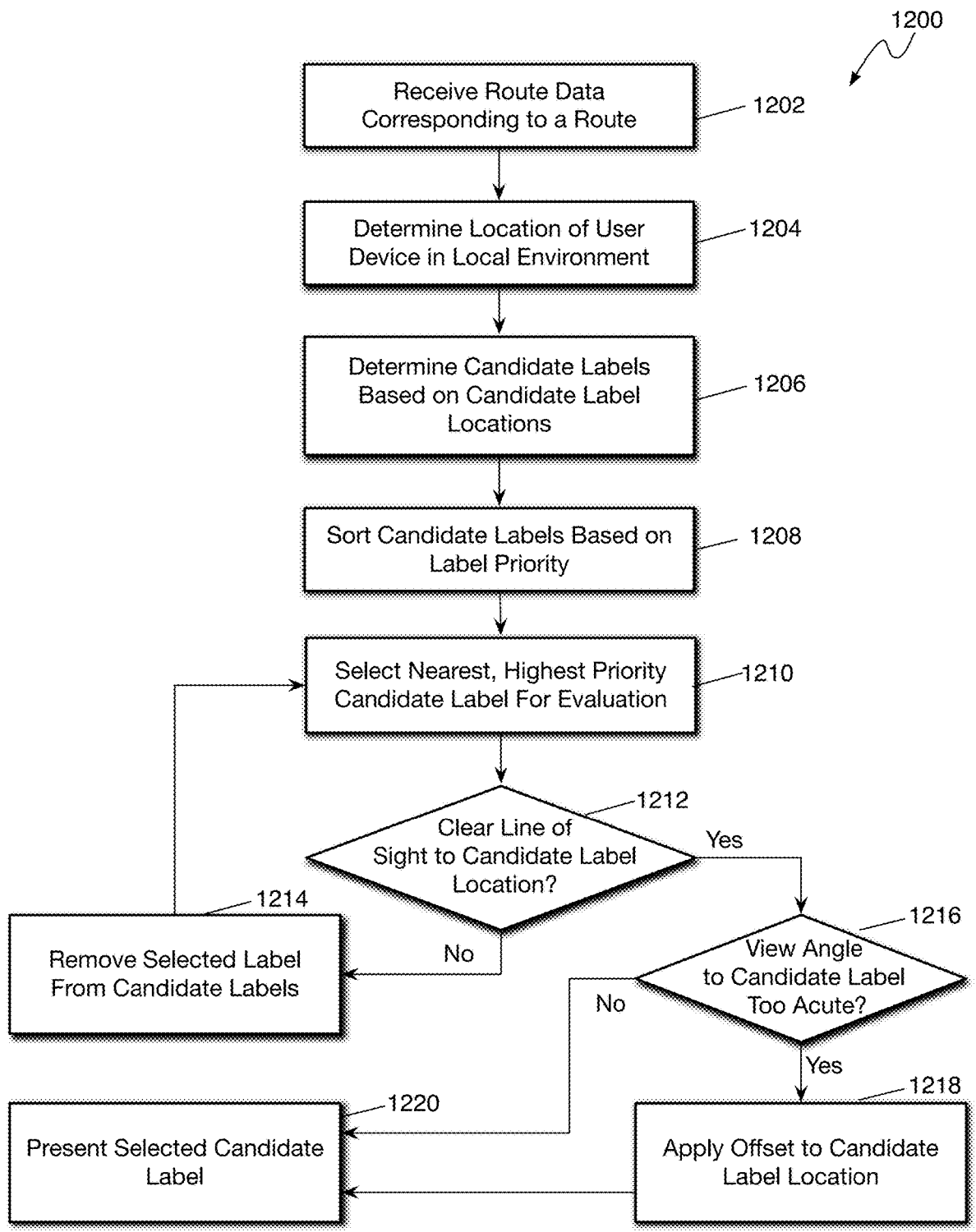
FIG. 12 is flow diagram of an example process for presenting labels in augmented reality.

FIG. 12 is flow diagram of an example process 1200 for presenting labels in augmented reality. For example, process 1200 can be performed by navigation application 104 on user device 102 to determine which label from a collection (e.g., list, sequence, etc.) of candidate labels to present in an AR video stream to aid the user in navigating a route. Process 1200 can start after the user has enabled the AR functionality of navigation application 104 and/or has invoked the AR video stream by raising user device 102 to a near vertical orientation, as described above. For example, navigation application 104 may be presenting the AR video stream on a display of user device 102 as process 1200 is being performed. In some implementations, process 1200 can be performed as part of the localization process performed for determining the precise current location of user device 102. In some implementations, process 1200 can be performed subsequent to the localization process performed for determining the precise current location of user device 102.

At step 1202, user device 102 can receive route data corresponding to a route requested by a user of user device 102. For example, navigation application 104 can receive user input requesting a route. The user input can include a starting location, a destination location, and/or a transportation mode for traversing the route. In some implementations, the AR functionality provided by navigation application can be restricted to select transportation modes for the safety of the user. For example, the AR functionality described here may be restricted to non-motorized personal transportation (e.g., walking, biking, etc.) and/or public transportation modes. In other implementations, the AR functionality described here may be available in all transportation modes, including personal motor vehicles.

Navigation application 104 can send the starting location, destination location, and/or transportation mode to map server 112 so that map server 112 can generate a route and corresponding route data, including the AR label and AR label location data described above. Map server 112 can send the route data and corresponding map data, if not previously sent, to navigation application 104 on user device 102.

At step 1204, user device 102 can determine the current location of user device in the local real-world environment. For example, navigation application 104 can perform the localization process described above to determine the precise location of user device 102 by scanning the local environment with a range sensor of user device 102. The precise location of user device 102 can be used to precisely locate user device 102 on a map described by the map data. The precise location of user device 102, the corresponding map data, and/or subsequent movements of user device 102 can be used by navigation application 104 to determine when to place AR elements (e.g., AR labels) in the AR video stream generated and/or presented by user device 102.

At step 1206, user device 102 can determine candidate labels based on candidate label locations. For example, navigation application 104 can select a list of candidate AR labels from the AR labels included in the route data based on the distance between the precise current location of user device 102 and the locations assigned to each of the AR labels in the route data. Navigation application 104 can select AR labels included in the route data as candidates for presentation in the AR video stream when the distance between the precise current location of user device 102 and a location for an AR label is between a maximum distance value and a minimum distance value. Navigation application 104 can select AR labels included in the route data as candidates for presentation in the AR video stream when the location for an AR label is between the precise current location of user device 102 and the destination location on the route. For example, navigation application 104 may not select an AR label that is located along a portion of the route that user device 102 has already traveled past.

At step 1208, user device 102 can sort candidate labels based on label priority. As described above, each AR label can be associated with a label type. The label types can include a destination label, a maneuver label, a continuation label, etc. Each label type can have a corresponding priority. For example, the destination label can have the highest priority, maneuver labels can have a medium priority, and the continuation label can have a low priority. Navigation application 104 can sort the candidate AR labels based on the corresponding priority for each label. For example, navigation application 104 can sort the candidate AR labels from highest to lowest.

At step 1210, user device 102 can select the highest priority candidate label for evaluation. For example, navigation application 104 can select the highest priority candidate label for evaluation in the subsequent steps of process 1200. In some implementations, navigation application 104 can select the highest priority candidate AR label that is closest in distance to user device 102 for evaluation. For example, when there are multiple candidate AR labels that have the same highest priority level, navigation application 104 can select the candidate AR label from the multiple highest priority level candidate AR labels that is nearest in distance to user device 102. Selecting the nearest, highest priority candidate AR label will result in navigation application 104 selecting the highest priority, unobscured AR label that is also nearest to user device 102 for presentation in the AR video stream, as described further below.

At step 1212, user device 102 can determine whether a clear line of sight to the selected candidate AR label exists. For example, navigation application 104 can determine whether a clear, unobscured line of sight exists between the precise location of user device 102 an all points (e.g., all tested points) on the selected candidate AR label at the location assigned to the candidate AR label, as described above. If a building, the ground, and/or other permanent structure obscures the view of the candidate AR label from the precise current location of user device 102, then the currently selected candidate AR label can be removed from the list of candidate AR labels and process 1200 can continue at step 1214. When a clear, unobscured line of sight exists between the precise current location of user device 102 and the currently selected candidate AR label, process 1200 can continue at step 216.

At step 1214, user device 102 can remove the selected candidate AR label from the list of candidate AR labels. For example, navigation application 104 can remove the currently selected candidate AR label from the list of candidate AR labels and select a new candidate AR label at step 1210.

At step 1216, user device 102 can determine whether the view angle from the precise current location of user device 102 to the location of the selected candidate AR label is too acute in relation to the face of the candidate AR label. For example, when the current location of user device 102 is at or near the edge of the candidate AR label, then the user of user device 102 may not be able to read the information on the face of the candidate AR label when navigation application 104 presents the candidate AR label in the AR video stream, as described above. When navigation application 104 determines that the precise current location of user device 102 creates a viewing angle of the face of the AR label that is less than a threshold angle (e.g., user device 102 is at an edge of the AR label), navigation application 104 can determine that the viewing angle is too acute and process 1200 can continue at step 1218. When navigation application 104 determines that the precise current location of user device 102 does not create a viewing angle of the face of the AR label that is less than a threshold angle (e.g., user device 102 is at an edge of the AR label), navigation application 104 can determine that the viewing angle is not too acute and process 1200 can continue at step 1220.

At step 1218, user device 102 can apply an offset to the location assigned to the currently selected candidate AR label. For example, navigation application 104 can add an offset distance value to the location assigned to the AR label to create a less acute angle between the precise current location of user device 102 and the face of the selected candidate AR label. The offset value can be applied to the location assigned to the AR label to cause the AR label to shift in a direction perpendicular to the face, or back, of the selected candidate AR label. When determining which way (e.g., front or back) to shift the selected candidate AR label, navigation application 104 can select the direction (e.g., front or back) that creates an angle closest to 90 degrees between the face of the selected candidate AR label and user device 102.

At step 1220, user device 102 can present the selected candidate AR label. For example, navigation application 104 can present the selected candidate AR label in the AR video stream when the location (e.g., assigned location, offset location, etc.) associated with the candidate AR label is captured in the AR video stream. Stated differently, navigation application 104 can present the selected candidate AR label in the AR video stream when a camera of user device 102 is directed at the location (e.g., assigned location, offset location, etc.) associated with the selected candidate AR label.

Figure 13:
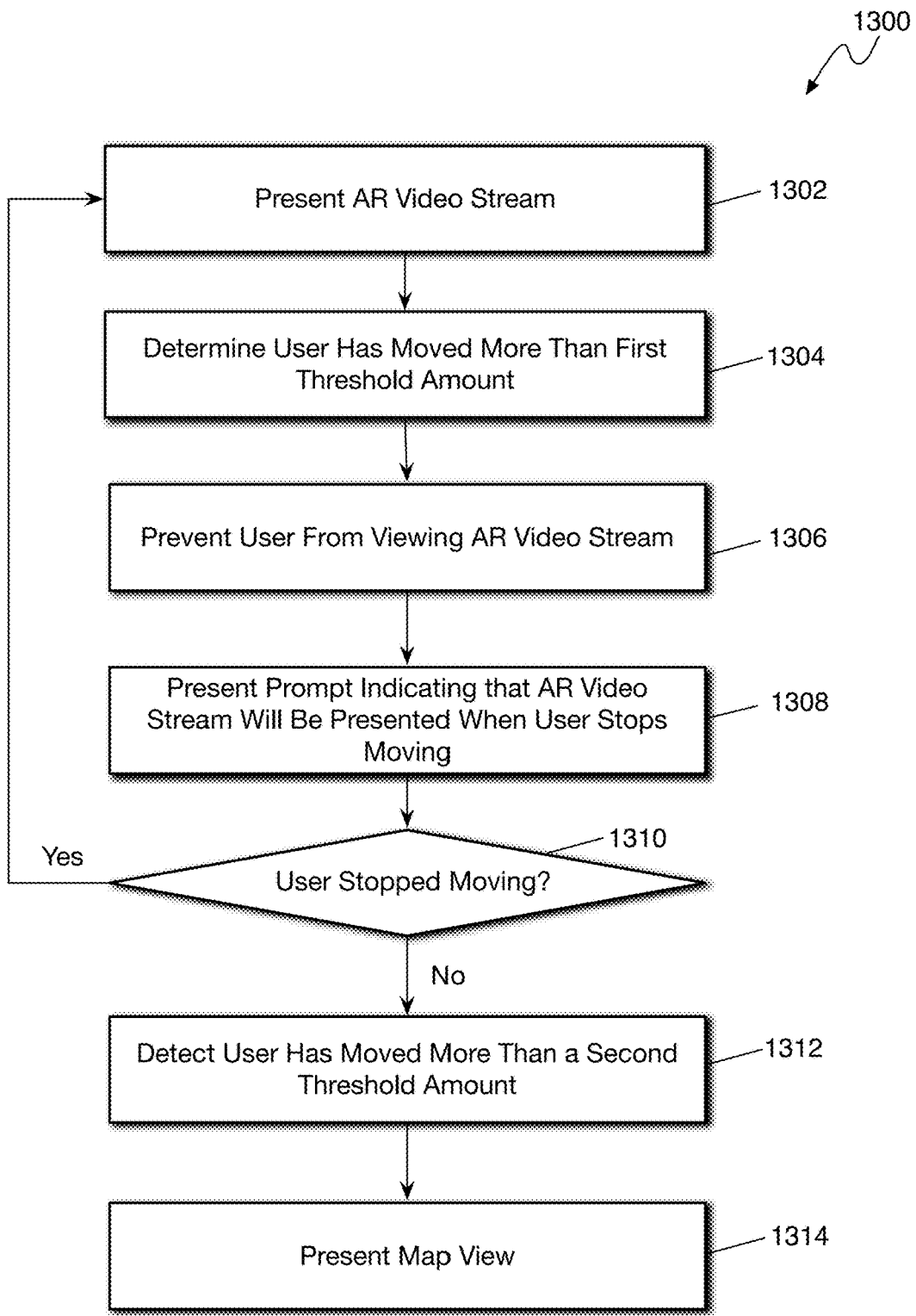
FIG. 13 is flow diagram of an example process for disabling an AR video stream to prevent harm to a user.

FIG. 13 is flow diagram of an example process 1200 for disabling an AR video stream to prevent harm to a user. For example, process 1200 can be performed by navigation application 104 to discourage the user of user device 102 from moving (e.g., walking, running, biking, etc.) while looking at the display of user device 102. As is commonly understood, when a user is walking, biking, running, etc. while not looking ahead to where they are going the user is more likely to be injured by running into objects (e.g., poles, cars, trees, etc.) on the street. Navigation application 104 can perform process 1200 to remind the user to look where they are going when they are moving.

At step 1302, user device 102 can present an AR video stream on a display of user device 102. For example, navigation application 104 can present an AR video stream on the display of user device 102 to provide route guidance to the user relative to the precise current location of user device 102.

At step 1304, user device 102 can determine that the user has moved more than a first threshold amount. For example, navigation application 104 can determine that the user, and/or user device 102, has moved more than a threshold amount of time, a threshold distance, a threshold number of steps, etc. while navigation application 104 is presenting the AR video stream.

At step 1306, user device 102 can prevent the user from viewing the AR video stream. For example, navigation application 104 can blur, or otherwise obscure, the AR video stream to prevent the user from viewing details (e.g., buildings, streets, AR labels, etc.) of the AR video stream.

At step 1308, user device 102 can present a warning prompt indicating that the AR video stream will be presented when the user stops moving. For example, navigation application 104 can present a prompt over the obscured AR video stream suggesting that the user not move while viewing the AR video stream. The prompt can indicate that an unobscured AR video stream will be presented again when the user stops moving.

In some implementations, user device 102 can perform steps 1306 and/or 1308 of process 1300 in a different order and/or may repeat steps 1306 and/or 1308 to provide different levels of warning to the user of user device 102. For example, instead of blurring the AR video stream as a first warning step, navigation application 104 can present the warning prompt while continuing to present the AR video stream. Navigation application 104 can blur the AR video stream when the user continues moving after the warning prompt is presented and exit the AR video stream when the user continues moving after the AR video stream is blurred, as described in detail above.

At step 1310, user device 102 can determine whether the user has stopped moving. For example, navigation application 104 can use motion sensor data received from motion sensors of user device 102 to determine that the user (e.g., user device 102) has stopped moving or is continuing to move. When the user has stopped moving, process 1300 can continue at step 1302. When the user has not stopped moving, process 1300 can continue at step 1312.

At step 1312, user device 102 can determine that the user has moved more than a second threshold amount. For example, navigation application 104 can determine that the user has continued moving after navigation application 104 has presented the prompt at step 1308 or blurred the AR video stream at step 1306. Navigation application 104 can determine that the user and/or user device 102 has continued moving more than a second threshold amount. For example, the threshold amount can be a threshold period of time (e.g., 3 seconds, 5 seconds, 10 seconds, etc.), a threshold distance (e.g., 3 feet, 7 feet, etc.), and/or a threshold number of steps (e.g., 5 steps, 8 steps, etc.).

At step 1314, user device 102 can present the map view on the display of user device 102. For example, navigation application 104 can terminate the AR video stream presented on the display of user device 102 and replace the AR video stream with a map view depicting a geographic area corresponding to the current route and the current route in response to navigation application 104 detecting, or determining, that the user or user device 102 has continued moving at step 1312. In some implementations, navigation application 104 can terminate the AR video stream and present a route overview on the map view as described above. In some implementations, navigation application 104 can terminate the AR video stream and present whatever graphical user interface was presented immediately before navigation application 104 started presenting the AR video stream. For example, if navigation application 104 was presenting a turn-by-turn navigation GUI when navigation application 104 switched to presenting the AR video stream, then navigation application 104 can return to presenting the turn-by-turn navigation GUI when navigation application 104 terminates the AR video stream.

In some implementations, user device 102 can allow the user to continue viewing the AR video stream while the user is moving. For example, user device 102 can perform steps 1302 and 1304, as described above, and present a safety alert on the AR video stream suggesting that the user not move while using the AR video stream feature when the user has moved more than the first threshold amount. User device 102 can dismiss the safety alert after the safety alert has been presented for a period of time (e.g., 2 seconds, 3 seconds, 5 seconds, etc.). User device 102 can continue to present the AR video stream to the user while the safety alert is presented to the user. For example, the safety alert can be presented as an overlay on the AR video stream while user device 102 continues presenting the AR video stream.

Figure 14:
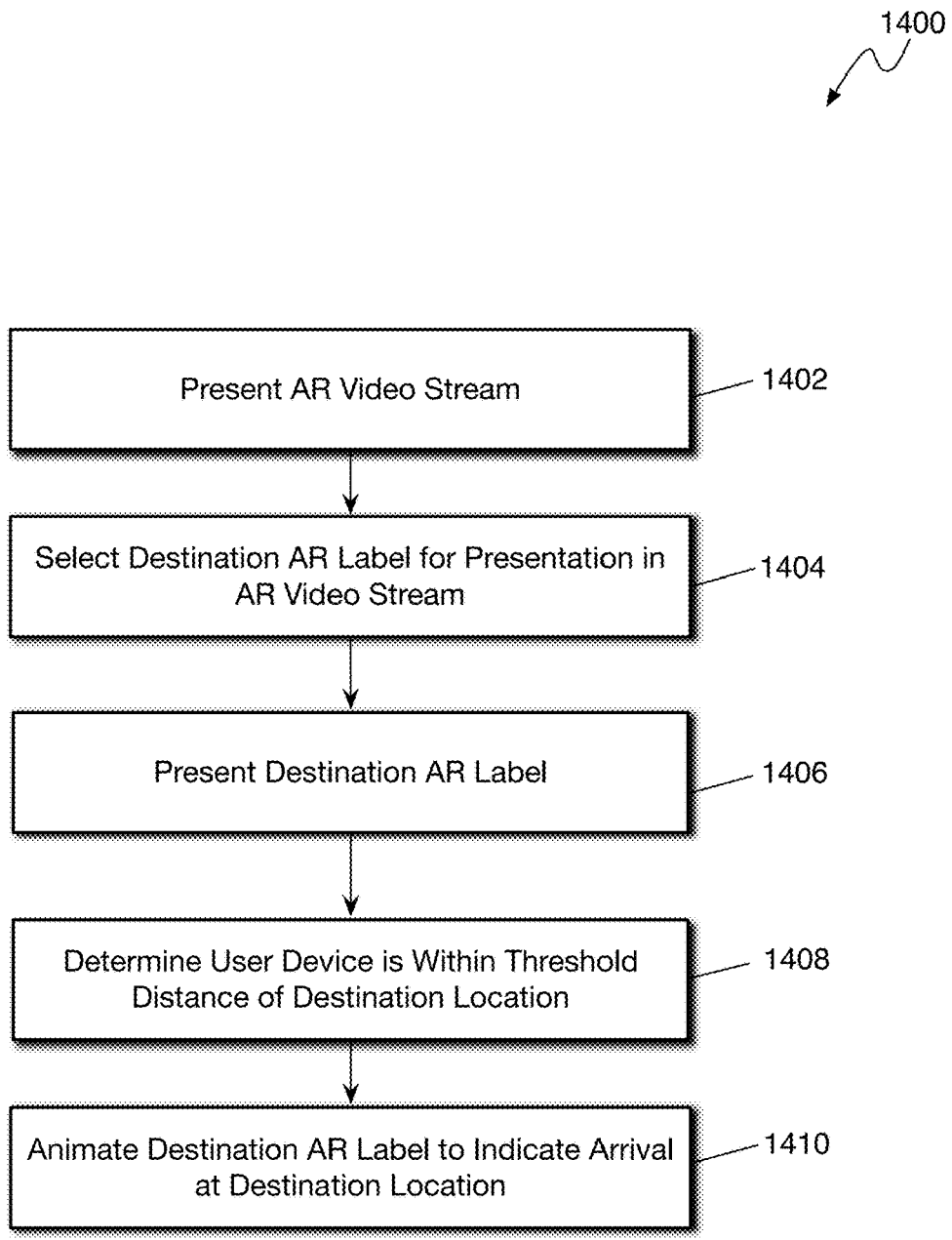
FIG. 14 is flow diagram of an example process for presenting a celebratory animation when a user arrives at the destination of a route.

FIG. 14 is flow diagram of an example process 1400 for presenting a celebratory animation when a user arrives at the destination of a route. For example, process 1400 can be performed by navigation application 104 on user device 102 to present an animation celebrating the arrival of the user (e.g., user device 102) at the destination of a currently traveled route.

At step 1402, user device 102 can present an AR video stream on a display of user device 102. For example, navigation application 104 can present an AR video stream on a display of user device 102.

At step 1406, user device 102 can select a destination AR label for presentation in the AR video stream. For example, navigation application 104 can select the AR label corresponding to the destination location of a currently traveled route using process 1200 described above.

At step 1406, user device 102 can present the destination AR label. For example, navigation application 104 can present the destination AR label in the AR video stream, as described above.

At step 1408, user device 102 can determine that user device 102 is within a threshold distance of the destination location of the currently traveled route. For example, navigation application 104 can determine that the precise current location of user device 102 is within a threshold distance of the destination location specified by the user for the route that the user is currently traversing.

At step 1410, user device 102 can animate the destination AR label to indicate the user's arrival at the destination location. For example, navigation application 104 can animate the destination AR label in the AR video stream in response to determining that user device 102 is within a threshold distance of the destination location to celebrate the user's arrival at the destination location. The animation can cause the destination AR label to appear to bounce and/or spin in the AR video stream, as described above with reference to FIG. 11.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to improve the user experience when using the AR navigation features described herein. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide relevant navigation guidance to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of navigation guidance, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, navigation guidance can be provided to the user by inferring preferences based on non-personal information data or a bare minimum amount of personal information, such as the content being requested by the device associated with a user, other non-personal information available to the navigation guidance services, or publicly available information.

Example System Architecture

Figure 15:
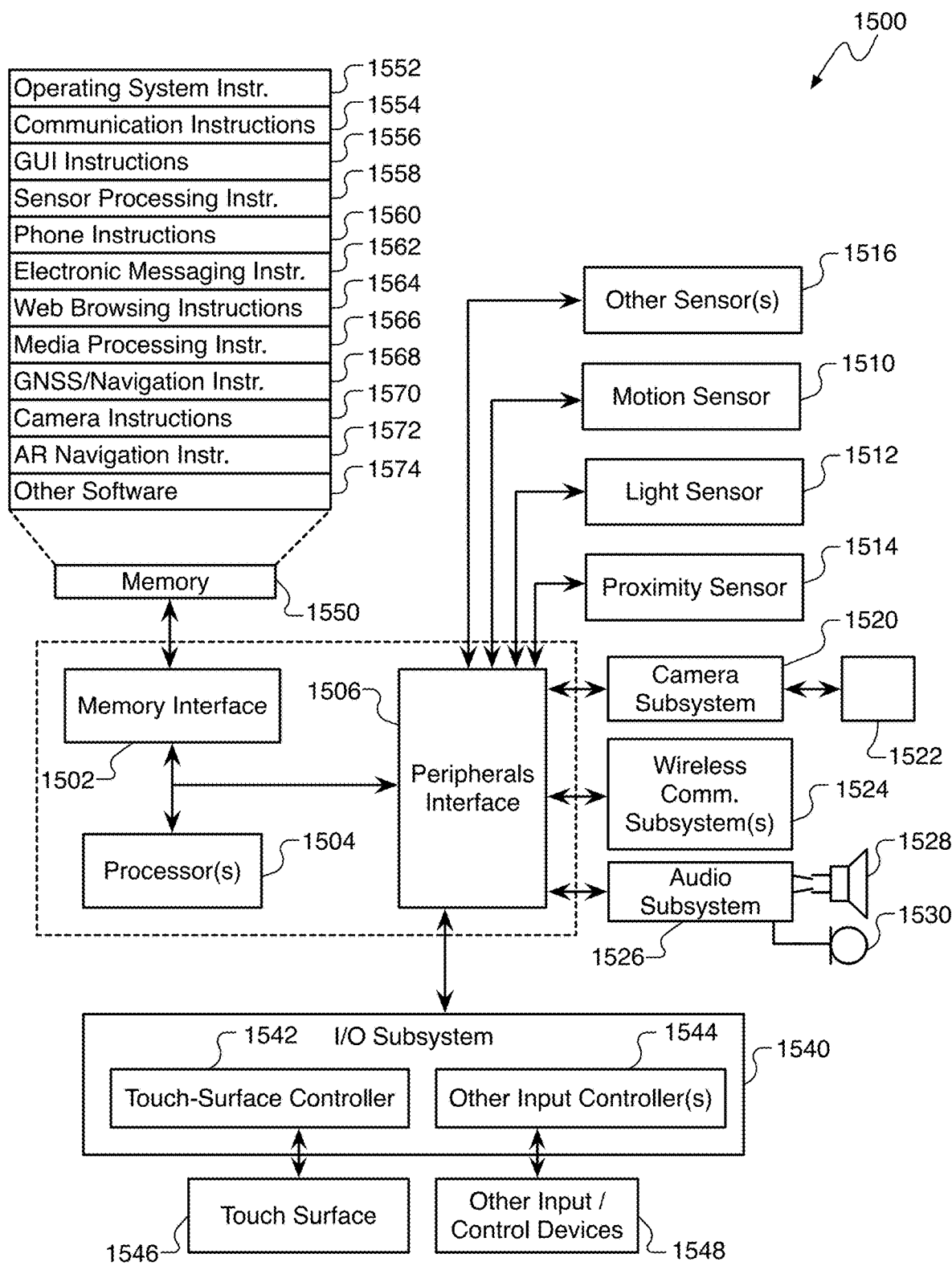
FIG. 15 is a block diagram of an example computing device that can implement the features and processes of FIGS. 1-14.

FIG. 15 is a block diagram of an example computing device 1500 that can implement the features and processes of FIGS. 1-14. The computing device 1500 can include a memory interface 1502, one or more data processors, image processors and/or central processing units 1504, and a peripherals interface 1506. The memory interface 1502, the one or more processors 1504 and/or the peripherals interface 1506 can be separate components or can be integrated in one or more integrated circuits. The various components in the computing device 1500 can be coupled by one or more communication buses or signal lines.

Sensors, devices, and subsystems can be coupled to the peripherals interface 1506 to facilitate multiple functionalities. For example, a motion sensor 1510, a light sensor 1512, and a proximity sensor 1514 can be coupled to the peripherals interface 1506 to facilitate orientation, lighting, and proximity functions. Other sensors 1516 can also be connected to the peripherals interface 1506, such as a global navigation satellite system (GNSS) (e.g., GPS receiver), a temperature sensor, a biometric sensor, magnetometer or other sensing device, to facilitate related functionalities.

A camera subsystem 1520 and an optical sensor 1522, e.g., a charged coupled device (CCD) or a complementary metal-oxide semiconductor (CMOS) optical sensor, can be utilized to facilitate camera functions, such as recording photographs and video clips. The camera subsystem 1520 and the optical sensor 1522 can be used to collect images of a user to be used during authentication of a user, e.g., by performing facial recognition analysis.

Communication functions can be facilitated through one or more wireless communication subsystems 1524, which can include radio frequency receivers and transmitters and/or optical (e.g., infrared) receivers and transmitters. The specific design and implementation of the communication subsystem 1524 can depend on the communication network(s) over which the computing device 1500 is intended to operate. For example, the computing device 1500 can include communication subsystems 1524 designed to operate over a GSM network, a GPRS network, an EDGE network, a Wi-Fi or WiMax network, and a Bluetooth™ network. In particular, the wireless communication subsystems 1524 can include hosting protocols such that the device 100 can be configured as a base station for other wireless devices.

An audio subsystem 1526 can be coupled to a speaker 1528 and a microphone 1530 to facilitate voice-enabled functions, such as speaker recognition, voice replication, digital recording, and telephony functions. The audio subsystem 1526 can be configured to facilitate processing voice commands, voiceprinting and voice authentication, for example.

The I/O subsystem 1540 can include a touch-surface controller 1542 and/or other input controller(s) 1544. The touch-surface controller 1542 can be coupled to a touch surface 1546. The touch surface 1546 and touch-surface controller 1542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1546.

The other input controller(s) 1544 can be coupled to other input/control devices 1548, such as one or more buttons, rocker switches, thumb-wheel, infrared port, USB port, and/or a pointer device such as a stylus. The one or more buttons (not shown) can include an up/down button for volume control of the speaker 1528 and/or the microphone 1530.

In one implementation, a pressing of the button for a first duration can disengage a lock of the touch surface 1546; and a pressing of the button for a second duration that is longer than the first duration can turn power to the computing device 1500 on or off. Pressing the button for a third duration can activate a voice control, or voice command, module that enables the user to speak commands into the microphone 1530 to cause the device to execute the spoken command. The user can customize a functionality of one or more of the buttons. The touch surface 1546 can, for example, also be used to implement virtual or soft buttons and/or a keyboard.

In some implementations, the computing device 1500 can present recorded audio and/or video files, such as MP3, AAC, and MPEG files. In some implementations, the computing device 1500 can include the functionality of an MP3 player, such as an iPod™.

The memory interface 1502 can be coupled to memory 1550. The memory 1550 can include high-speed random-access memory and/or non-volatile memory, such as one or more magnetic disk storage devices, one or more optical storage devices, and/or flash memory (e.g., NAND, NOR). The memory 1550 can store an operating system 1552, such as Darwin, RTXC, LINUX, UNIX, OS X, WINDOWS, or an embedded operating system such as VxWorks.

The operating system 1552 can include instructions for handling basic system services and for performing hardware dependent tasks. In some implementations, the operating system 1552 can be a kernel (e.g., UNIX kernel). In some implementations, the operating system 1552 can include instructions for performing the augmented reality (AR) navigation features described herein. For example, operating system 1552 can implement the AR navigation features as described with reference to FIGS. 1-14.

The memory 1550 can also store communication instructions 1554 to facilitate communicating with one or more additional devices, one or more computers and/or one or more servers. The memory 1550 can include graphical user interface instructions 1556 to facilitate graphic user interface processing; sensor processing instructions 1558 to facilitate sensor-related processing and functions; phone instructions 1560 to facilitate phone-related processes and functions; electronic messaging instructions 1562 to facilitate electronic-messaging related processes and functions; web browsing instructions 1564 to facilitate web browsing-related processes and functions; media processing instructions 1566 to facilitate media processing-related processes and functions; GNSS/Navigation instructions 1568 to facilitate GNSS and navigation-related processes and instructions; and/or camera instructions 1570 to facilitate camera-related processes and functions.

The memory 1550 can store software instructions 1572 to facilitate other processes and functions, such as the AR navigation processes and functions as described with reference to FIGS. 1-14.

The memory 1550 can also store other software instructions 1574, such as web video instructions to facilitate web video-related processes and functions; and/or web shopping instructions to facilitate web shopping-related processes and functions. In some implementations, the media processing instructions 1566 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1550 can include additional instructions or fewer instructions. Furthermore, various functions of the computing device 1500 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method of comprising:
  presenting, by a navigation application executing on a computing device, an augmented reality video stream displaying a portion of a route to a destination;
  presenting a destination label, pertaining to the destination, in the augmented reality video stream;
  determining that the computing device is within a threshold distance of the destination; and
  responsive to determining that the computing device is within a threshold distance of the destination: animating the destination label;
  wherein animating the destination label comprises moving the destination label relative to the destination.

2. The method of claim 1, wherein animating the destination label comprises one of causing the destination label to bounce or causing the destination label to spin.

3. The method of claim 1, wherein the augmented reality video stream includes video data captured by a camera of the computing device.

4. The method of claim 1, wherein determining that the computing device is within the threshold distance of the destination comprises determining that the computing device has arrived at the destination.

5. The method of claim 1, wherein animating the destination label indicates arrival at the destination.

6. The method of claim 1, wherein presenting a destination label, pertaining to the destination, in the augmented reality video stream comprises one of presenting the destination label in an entrance to a structure associated with the destination or presenting the destination label on a same side of a street as the destination location.

7. The method of claim 1, wherein the destination label has an appearance that represents a location associated with the destination.

8. The method of claim 1, wherein animating the destination label comprises animating the destination label without animating other labels in the augmented reality video stream.

9. A non-transitory computer readable medium including one or more sequences of instructions that, when executed by one or more processors, cause the processors to perform operations comprising:
  presenting, by a navigation application executing on a computing device, an augmented reality video stream displaying a portion of a route to a destination;
  presenting a destination label, pertaining to the destination, in the augmented reality video stream;
  determining that the computing device is within a threshold distance of the destination; and
  responsive to determining that the computing device is within a threshold distance of the destination: animating the destination label;
  wherein animating the destination label comprises moving the destination label relative to the destination.

10. The non-transitory computer readable medium of claim 9, wherein animating the destination label comprises one of causing the destination label to bounce or causing the destination label to spin.

11. The non-transitory computer readable medium of claim 9, wherein the augmented reality video stream includes video data captured by a camera of the computing device.

12. The non-transitory computer readable medium of claim 9, wherein determining that the computing device is within the threshold distance of the destination comprises determining that the computing device has arrived at the destination.

13. The non-transitory computer readable medium of claim 9, wherein animating the destination label indicates arrival at the destination.

14. The non-transitory computer readable medium of claim 9, wherein presenting a destination label, pertaining to the destination, in the augmented reality video stream comprises one of presenting the destination label in an entrance to a structure associated with the destination or presenting the destination label on a same side of a street as the destination location.

15. The non-transitory computer readable medium of claim 9, wherein the destination label has an appearance that represents a location associated with the destination.

16. A computing device comprising:
  one or more processors; and
  a non-transitory computer readable medium including one or more sequences of instructions that, when executed by the one or more processors, cause the processors to perform operations comprising:
  presenting, by a navigation application executing on a computing device, an augmented reality video stream displaying a portion of a route to a destination;
  presenting a destination label, pertaining to the destination, in the augmented reality video stream;
  determining that the computing device is within a threshold distance of the destination; and
  responsive to determining that the computing device is within a threshold distance of the destination: animating the destination label;
  wherein animating the destination label comprises moving the destination label relative to the destination.

17. The computing device of claim 16, wherein animating the destination label comprises one of causing the destination label to bounce or causing the destination label to spin.

18. The computing device of claim 16, wherein the augmented reality video stream includes video data captured by a camera of the computing device.

19. The computing device of claim 16, wherein determining that the computing device is within the threshold distance of the destination comprises determining that the computing device has arrived at the destination.

20. The computing device of claim 16, wherein animating the destination label indicates arrival at the destination.

21. The computing device of claim 16, wherein presenting a destination label, pertaining to the destination, in the augmented reality video stream comprises one of presenting the destination label in an entrance to a structure associated with the destination or presenting the destination label on a same side of a street as the destination location.

* * * * *